US008513366B2

(12) United States Patent
Sita et al.

(10) Patent No.: US 8,513,366 B2
(45) Date of Patent: Aug. 20, 2013

(54) METHODS FOR MODULATED DEGENERATIVE TRANSFER LIVING POLYMERIZATION AND ISOTACTIC-ATACTIC STEREOBLOCK AND STEREOGRADIENT POLY(OLEFINS) THEREBY

(75) Inventors: Lawrence R. Sita, Silver Spring, MD (US); Matthew B. Harney, Fairfax, VA (US); Yonghui Zhang, Old Saybrook, CT (US)

(73) Assignee: University of Maryland, College Park, College Park, MD (US)

( * ) Notice: Subject to any disclaimer, the term of this patent is extended or adjusted under 35 U.S.C. 154(b) by 911 days.

(21) Appl. No.: 11/886,535

(22) PCT Filed: Mar. 17, 2006

(86) PCT No.: PCT/US2006/009767
§ 371 (c)(1),
(2), (4) Date: Mar. 30, 2009

(87) PCT Pub. No.: WO2006/102106
PCT Pub. Date: Sep. 28, 2006

(65) Prior Publication Data
US 2009/0220786 A1   Sep. 3, 2009

Related U.S. Application Data

(60) Provisional application No. 60/662,551, filed on Mar. 17, 2005.

(51) Int. Cl.
*C08F 2/00* (2006.01)
*C08F 4/72* (2006.01)
*C08F 210/00* (2006.01)
*C08F 110/06* (2006.01)

(52) U.S. Cl.
USPC .............. 526/86; 526/170; 526/348; 526/351

(58) Field of Classification Search
USPC .................................. 526/86, 170, 348, 351
See application file for complete search history.

(56) References Cited

U.S. PATENT DOCUMENTS

| 3,175,999 | A | 3/1965 | Natta et al. |
| 3,903,017 | A | 9/1975 | Ziegler et al. |
| 4,335,225 | A | 6/1982 | Collette et al. |
| 4,522,982 | A | 6/1985 | Ewen |
| 4,530,914 | A | 7/1985 | Ewen et al. |
| 5,162,466 | A | 11/1992 | Karol et al. |
| 5,214,173 | A | 5/1993 | Jordan et al. |
| 5,317,036 | A | 5/1994 | Brady, III et al. |
| 5,318,935 | A | 6/1994 | Canich et al. |
| 5,527,752 | A | 6/1996 | Reichle et al. |
| 5,594,080 | A | 1/1997 | Waymouth et al. |
| 5,674,795 | A | 10/1997 | Wasserman et al. |
| 5,681,908 | A | 10/1997 | Mehra et al. |
| 5,726,332 | A | 3/1998 | Eisch et al. |
| 5,756,614 | A | 5/1998 | Chien et al. |
| 5,866,659 | A | 2/1999 | Chung et al. |
| 5,912,202 | A | 6/1999 | Oskam et al. |
| 5,969,070 | A | 10/1999 | Waymouth et al. |
| 6,063,105 | A | 5/2000 | Totakura |
| 6,211,311 | B1 | 4/2001 | Wang et al. |
| 6,429,274 | B1 | 8/2002 | Siedle et al. |
| 6,448,358 | B2 | 9/2002 | Siedle et al. |
| 6,541,583 | B2 | 4/2003 | Meverden et al. |
| 6,579,998 | B2 | 6/2003 | Sita et al. |
| 6,737,487 | B2 | 5/2004 | Meverden et al. |
| 6,777,476 | B2 | 8/2004 | Jeong et al. |
| 7,053,157 | B2 | 5/2006 | Sita et al. |
| 7,105,604 | B2 * | 9/2006 | Shimizu et al. ............... 525/191 |
| 7,183,364 | B2 | 2/2007 | Sita et al. |
| 7,868,088 | B2 * | 1/2011 | Sita et al. ......................... 525/89 |
| 2002/0002261 | A1 * | 1/2002 | Yahata et al. .................. 526/351 |
| 2002/0010265 | A1 * | 1/2002 | Johnson et al. .................. 525/74 |
| 2002/0045536 | A1 * | 4/2002 | Sita et al. ....................... 502/104 |

(Continued)

FOREIGN PATENT DOCUMENTS

| EP | 0 416 815 A2 | 3/1991 |
| WO | WO 96/08519 A2 | 3/1996 |

(Continued)

OTHER PUBLICATIONS

Andresen, A., et al., "Halogen-Free Soluble Ziegler Catalysts for the Polymerization of Ethylene. Control of Molecular Weight by Choice of Temperature," *Angew. Chem. Int. Ed. Engl.* 15: 630-632, VCH Verlagsgesellschaft (1976).

Asakura, T., et al., "Carbon-13 NMR Spectral Assignment of Five Polyolefins Determined from the Chemical Shift Calculation and the Polymerization Mechanism," *Macromolecules* 24:2334-2340, American Chemical Society (1991).

Babu, G. N., et al., "Microstructure of Poly(1-hexene) Produced by ansa-Zirconocenium Catalysis," *Macromolecules* 27:3383-3388, American Chemical Society (1994).

(Continued)

*Primary Examiner* — Liam Heincer
(74) *Attorney, Agent, or Firm* — Sterne, Kessler, Goldstein & Fox P.L.L.C.

(57) ABSTRACT

Methods for modulated degenerative transfer living polymerization and isotactic-atactic stereoblock and stereogradient poly(olefins) thereby Abstract A method of producing a multiblock, stereoblock polyolefin having substantially uniform microstructure is disclosed. The method includes contacting a Ziegler-Natta pre-catalyst with a co-catalyst and an olefin to polymerize the olefin and form a first stereoblock, adding a methyl donator that changes the stereoregularity of the polymerization, and polymerizing the olefin to form a second stereoblock. The methods of the present invention allow for the production of poly(olefin)s having predictable degrees of incorporation of stereoerrors of a known type. The methods allows for the production of a variety of poly(olefin) microstructures, ranging from stereoblock to stereogradient poly(olefin)s and poly(olefin)s having fully isotactic to fully atactic microstructures.

35 Claims, 18 Drawing Sheets

(56) References Cited

U.S. PATENT DOCUMENTS

| | | | |
|---|---|---|---|
| 2002/0193535 A1* | 12/2002 | Meverden et al. | 526/127 |
| 2003/0060581 A1* | 3/2003 | Morini et al. | 526/125.3 |
| 2004/0063877 A1* | 4/2004 | Starzewski et al. | 526/170 |
| 2004/0106751 A1* | 6/2004 | Wenzel et al. | 526/82 |
| 2004/0110632 A1* | 6/2004 | Sita et al. | 502/155 |
| 2004/0138391 A1* | 7/2004 | Burdett et al. | 526/88 |
| 2004/0138392 A1* | 7/2004 | Jiang et al. | 526/114 |
| 2004/0171855 A1* | 9/2004 | Fritze et al. | 556/11 |
| 2004/0186253 A1 | 9/2004 | Sita et al. | |
| 2004/0198930 A1* | 10/2004 | Sita et al. | 526/113 |
| 2004/0220359 A1* | 11/2004 | Abhari et al. | 526/65 |
| 2005/0131160 A1* | 6/2005 | Shimizu et al. | 525/242 |
| 2005/0131172 A1* | 6/2005 | Morini et al. | 526/128 |
| 2005/0137343 A1* | 6/2005 | Datta et al. | 525/240 |
| 2005/0197461 A1* | 9/2005 | Datta et al. | 525/240 |
| 2006/0009594 A1* | 1/2006 | Meesters et al. | 526/124.3 |
| 2006/0160966 A9* | 7/2006 | Datta et al. | 526/126 |
| 2006/0241254 A1* | 10/2006 | Razavi | 526/113 |
| 2007/0203310 A1 | 8/2007 | Sita et al. | |
| 2009/0209703 A1* | 8/2009 | Sita et al. | 525/89 |
| 2009/0220786 A1* | 9/2009 | Sita et al. | 428/401 |
| 2011/0028654 A1* | 2/2011 | Sita et al. | 525/232 |

FOREIGN PATENT DOCUMENTS

| | | |
|---|---|---|
| WO | WO 98/30606 A1 | 7/1998 |
| WO | WO 01/30858 A1 | 5/2001 |
| WO | WO 03/008459 A1 | 1/2003 |

OTHER PUBLICATIONS

Barner-Kowollik, C., et al., "Modeling the Reversible Addition-Fragmentation Chain Transfer Process in Cumyl Dithiobenzoate-Mediated Styrene Homopolymerizations: Assessing Rate Coefficients for the Addition-Fragmentation Equilibrium," *J. Polymer Sci.: Part A: Polymer Chem.* 39:1353-1365, John Wiley & Sons, Inc. (2001).

Baumann, R., et al., "Synthesis of Titanium and Zirconium Complexes That Contain the Tridentate Diamido Ligand, [((t-Bu-$d_6$)N-o-$C_6H_4$)$_2$O]$^{2-}$) ([NON]$^{2-}$) and the Living Polymerization of 1-Hexene by Activated [NON]ZrMe$_2$," *J. Am. Chem. Soc.* 119: 3830-3831, American Chemical Society (1997).

Bochmann, M., and Lancaster, S.J., "Monomer-Dimer Equilibria in Homo- and Heterodinuclear Cationic Alkylzirconium Complexes and Their Role in Polymerization Catalysis," *Angew. Chem. Int. Ed Engl.* 33:1634-1637, VCH Verlagsgesellschaft (1994).

Bravakis, A.M., et al., "Synthesis of Elastomeric Poly(propylene) Using Unsymmetrical Zirconocene Catalysts: Marked Reactivity Differences of 'Rac'- and 'Meso'-like Diastereomers," *Macromolecules* 31:1000-1009, American Chemical Society (1998).

Brintzinger, H.H., et al., "Stereospecific Olefin Polymerization with Chiral Metallocene Catalysts," *Angew. Chem. Int. Ed. Engl.* 34:1143-1170, VCH Verlagsgesellschaft (1995).

Britovsek, G.J.P. et al., "The Search for New-Generation Olefin Polymerization Catalysts: Life beyond Metallocenes," *Angew. Chem. Int. Ed.* 38:429-447, Wiley-VCH (1999).

Chen, Y.-X., et al., "Organo-Lewis Acids as Cocatalysts in Cationic Metallocene Polymerization Catalysis. Unusual Characteristics of Sterically Encumbered Tris(perfluorobiphenyl)borane," *J. Am. Chem. Soc.* 118:12451-12452, American Chemical Society (1996).

Chernega, A. N., et al., "Mono-η-cyclopentadienyl-benzarnidinato Compounds of Titanium, Zirconium and Hafnium," *J. Chem. Soc. Chem. Commun.*, pp. 1415-1417, Royal Society of Chemistry (1993).

Coates, G.W., and Waymouth, R.M., "Oscillating Stereocontrol: A Strategy for the Synthesis of Thermoplastic Elastomeric Polypropylene," *Science* 267:217-219, American Association for the Advancement of Science (1995).

Coates, G.W., et al., "Catalysts for the Living Insertion Polymerization of Alkenes: Access to New Polyolefin Architectures Using Ziegler-Natta Chemistry," *Angew. Chem. Int. Ed.* 41:2236-2257, Wiley-VCH (2002).

Coughlin, E.B., et al., "Iso-Specific Ziegler-Natta Polymerization of α-Olefins with a Single-Component Organoyttrium Catalyst," *J. Am. Chem. Soc.* 114:7606-7607, American Chemical Society (1992).

De Rosa, C., et al., "Mechanical Properties and Elastic Behavior of High-Molecular-Weight Poorly Syndiotactic Polypropylene," *Macromolecules* 36:7607-7617, American Chemical Society (2003).

Ewen, J. A., "Mechanisms of Stereochemical Control in Propylene Polymerizations with Soluble Group 4B Metallocene/Methylalumoxane Catalysts," *J. Am. Chem. Soc.* 106:6355-6364, American Chemical Society (1984).

Ewen, J. A., "Symmetry rules and reaction mechanisms of Ziegler-Natta catalysts," *J. Mol. Cat. A*: Chem. 128:103-109, Elsevier (1998).

Hawker, C.J., "'Living' Free Radical Polymerization: A Unique Technique for the Preparation of Controlled Macromolecular Architectures," *Acc. Chem. Res.* 30:373-382, American Chemical Society (1997).

Hlatky, G.G., et al., "Ionic, Base-Free Zirconocene Catalysts for Ethylene Polymerization," *J. Am. Chem. Soc.* 111:2728-2729, American Chemical Society (1989).

Jayaratne, K.C., and Sita, L.R., "Direct Methyl Group Exchange between Cationic Zirconium Ziegler-Natta Initiators and Their Living Polymers: Ramifications for the Production of Stereoblock Polyolefins," *J. Am. Chem. Soc.* 123:10754-10755, American Chemical Society (2001).

Jayaratne, K.C., and Sita, L.R., "Stereospecific Living Ziegler-Natta Polymerization of 1-Hexene," *J. Am. Chem. Soc.* 122:958-959, American Chemical Society (2000).

Jayaratne, K.C., et al., "Living Ziegler-Natta Cyclopolymerization of Nonconjugated Dienes: New Classes of Microphase-Separated Polyolefin Block Copolymers via a Tandem Polymerization/Cyclopolymerization Strategy," *J. Am. Chem. Soc.* 122:10490-10491, American Chemical Society (2000).

Jia, L., et al., "Cationic Metallocene Polymerization Catalysts Based on Tetrakis(pentafluorophenyl)borate and its Derivatives. Probing the Limits of Anion 'Noncoordination' via a Synthetic, Solution Dynamic, Structural, and Catalytic Olefin Polymerization Study," *Organometallics* 16:842-857, American Chemical Society (1997).

Keaton, R.J., et al., "Dramatic Enhancement of Activities for Living Ziegler-Natta Polymerizations Mediated by 'Exposed' Zirconium Acetamidinate Initiators: The Isospecific Living Polymerization of Vinylcyclohexane," *J. Am. Chem. Soc.* 123:6197-6198, American Chemical Society (2001).

Keaton, R.J., et al., "Regarding the Stability of $d^0$ Monocyclopentadienyl Zirconium Acetamidinate Complexes Bearing Alkyl Substituents with β-Hydrogens," *J. Am. Chem. Soc.* 124:5932-5933, American Chemical Society (2002).

Keaton, R.J., et al., "Structural Characterization of Zirconium Cations Derived from a Living Ziegler-Natta Polymerization System: New Insights Regarding Propagation and Termination Pathways for Homogenous Catalysts," *J. Am. Chem. Soc.* 122:12909-12910, American Chemical Society (2000).

Kesti, M. R., et al., "Homogeneous Ziegler-Natta Polymerization of Functionalized Monomers Catalyzed by Cationic Group IV Metallocenes," *J. Am. Chem. Soc.* 114:9679-9680, American Chemical Society (1992).

Koterwas, L. A., et al., "Stereospecific Syntheses, Metal Configurational Stabilities, and Conformational Analysis of meso-(R,S)- and (R,R)-(η$^5$-$C_5R_5$)Ti(CH$_3$)$_2$-N,N-bis(1-phenylethyl)acetamidinates for R = H and Me," *Organometallics* 18:4183-4190 (1999).

Mallin, D.T., et al., "rac-[Ethylidene(1-η$^5$-tetramethylcyclopentadienyl)(1- η$^5$-indenyl)]dichlorotitanium and Its Homopolymerization of Propylene to Crystalline-Amorphous Block Thermoplastic Elastomers," *J Am. Chem. Soc.* 112:2030-2031, American Chemical Society (1990).

Matyjaszewski, K., and Müller, A.H.E., "Naming of Controlled, Living and 'Living' Polymerizations," *Macromolecular Nomenclature Note No. 12, The Nomenclature Committee of the ACS Division of Polymer Chemistry Guest Presentation*, pp. 1-6, last accessed online at http://www.chem.umr.edu/~poly/poly_link/nomcl/mnn12.html on Nov. 28, 2003.

Matyjaszewski, K., "Macromolecular Engineering by Controlled/Living Ionic and Radical Polymerizations," *Macromol. Symp.* 174:51-67, Wiley-VCH Verlag GmbH (2001).

Mehrkhodavandi, P., et al., "A Comparison of Cationic Zirconium Methyl and Isobutyl Initiators that Contain an Arylated Diamido-Pyridine Ligand for Polymerization of 1-Hexene. Elucidation of a Dramatic 'Initiator Effect'," *J. Am. Chem. Soc.* 122:7841-7842, American Chemical Society (2000).

Müller, A.H.E., et al., "Kinetic Analysis of 'Living' Polymerization Processes Exhibiting Slow Equilibria. 1. Degenerative Transfer (Direct Activity Exchange between Active and 'Dormant' Species). Application to Group Transfer Polymerization," *Macromolecules* 28:4326-4333, American Chemical Society (1995).

Müller, A.H.E., et al., "Kinetic Analysis of 'Living' Polymerization Processes Exhibiting Slow Equilibria. 2. Molecular Weight Distribution for Degenerative Transfer (Direct Activity Exchange between Active and 'Dormant' Species) at Constant Monomer Concentration," *Macromolecules* 28:7335-7338, American Chemical Society (1995).

Scollard, J. D., and McConville, D. H., "Living Polymerization of α-Olefins by Chelating Diamide Complexes of Titanium," *J. Am. Chem. Soc.* 118:10008-10009, American Chemical Society (1996).

Sita, L. R., and Babcock, J. R., "Rapid Access to Dimethylcyclopentadienyltitanium(IV) Amidinate, $(C_5R_5)TiMe_2[NR^1C(R^2)NR^3]$ ($R$ = H and Me; $R^2$ = Me), Libraries," *Organometallics* 17:5228-5230, American Chemical Society (1998).

Vollmerhaus, R., et al., "Ethylene Polymerization Using β-Diketimine Complexes of Zirconium," *Organometallics* 19:2161-2169, American Chemical Society (2000).

Yang, X., et al, "'Cation-like' Homogenous Olefin Polymerization Catalysts Based upon Zirconocene Alkyls and Tris(pentafluorophenyl)borane," *J. Am. Chem. Soc.* 113:3623-3625, American Chemical Society (1991).

Zhang, Y., et al., "Degenerative Transfer Living Ziegler-Natta Polymerization: Application to the Synthesis of Monomodal Stereoblock Polyolefins of Narrow Polydispersity and Tunable Block Length," *J. Am. Chem. Soc.* 125:9062-9069, American Chemical Society (2003).

Zhang, Y., et al., "Stereospecific Living Ziegler-Natta Polymerization via Rapid and Reversible Chloride Degenerative Transfer between Active and Dormant Sites," *J. Am. Chem. Soc.* 126:7776-7777, American Chemical Society (2004).

"Living Radical Polymerization," *Tharani's "Living" Radical Polymerization Page*, pp. 1-5, last updated Sep. 17, 1997, last accessed online at http://www.geocities.com/Athens/Forum/3682/lrp.html on Nov. 20, 2003.

"Metallocene as Olefin Polmerization Catalysts: An Introduction," available on-line at: http://www.chem.ucalgary.ca/groups/ziegler/met_intro.html (first accessed Jun. 16, 2005; last accessed Dec. 13, 2005).

International Search Report for International Application No. PCT/US06/009767, United States Patent and Trademark Office, Alexandria, VA, mailed on Jul. 28, 2006.

Co-pending U.S. Appl. No. 11/698,975, inventors Sita, L. et al., filed Jan. 29, 2007; now published as PCT/US07/0203310 A1 (listed on accompanying form PTO/SB/08A as document US30).

Co-pending U.S. Appl. No. 11/886,536, inventors Sita, L. et al., filed Sep. 17, 2007 (Not Published).

* cited by examiner a-i Diblock $M_n$ = 164 200, $D$=1.19, $mmmm$ = 0.33 a-i-a Triblock $M_n$ = 167 500, $D$=1.19, $mmmm$ = 0.38 a-i-a-i Tetrablock $M_n$ = 172 400, $D$=1.19, $mmmm$ = 0.32

METHODS FOR MODULATED DEGENERATIVE TRANSFER LIVING POLYMERIZATION AND ISOTACTIC-ATACTIC STEREOBLOCK AND STEREOGRADIENT POLY(OLEFINS) THEREBY

STATEMENT REGARDING FEDERALLY-SPONSORED RESEARCH AND DEVELOPMENT

Part of the work performed during development of this invention utilized U.S. Government funds. The work was partly funded by the National Science Foundation Grant CHE-0092493. The U.S. Government has certain rights in this invention.

BACKGROUND OF THE INVENTION

1. Field of the Invention

The present invention relates to methods of manufacturing isotactic-atactic poly(olefin) compositions and isotactic-atactic poly(olefin)s produced thereby.

2. Background Art

Thermoplastic poly(olefin) elastomers, such as polypropylene (PP), based on an isotactic-atactic stereoblock microstructure have been the focus of interest for nearly 50 years in the continuing quest for 'new materials from old monomers' through the Ziegler-Natta polymerization of olefins (Natta, G. J., *Polym. Sci.* 34:531-549 (1959); Collete, J. W., et al., *Macromolecules:* 22, 3851-3858 (1989); Mallin, D. T., et al., *J. Am. Chem. Soc.* 112:2030-2031 (1990); Coates, G. W. and Waymouth, R. M., *Science* 267:217-219 (1995); Miller, S. A., *Macromolecules* 37:3983-3995 (2004)). Natta first proposed nearly half a century ago a new class of thermoplastic elastomer based on an isotactic-atactic stereoblock poly(propylene) microstructure (G. Natta, *J. Polym. Sci.* 34:531 (1959)). Subsequent efforts to obtain such materials under controlled conditions resulted in the production of elastomers that were determined to have an isotactic-atactic stereoblock microstructure (See, for example: J. W. Collette, C. W. Tullock, R. N. MacDonald, W. H. Buck, A. C. L. Su, J. R. Harrell, R. Mülhaupt, B. C. Anderson, *Macromolecules* 22:3851 (1989); D. T. Mallin, M. D. Rausch, Y. G. Lin, S. Dong, J. C. W. Chien, *J. Am. Chem. Soc.* 112:2030 (1990); and G. W. Coates, R. M. Waymouth, *Science* 267:217 (1995)). However, owing to the probabilistic way in which the microstructure evolves in these polymerizations, all the materials reported to date are actually stereochemical heterogeneous in nature; that is, the collection of polymer chains in the sample represents a distribution of stereochemical microstructures (L. Resconi, L. Cavallo, A. Fait, F. Piemontesi, *Chem. Rev.* 100:1253 (2000)).

Although a few strategies have now been reported to provide isotactic-atactic stereoblock poly(propylene) under controlled conditions, all the materials obtained to date are, in fact, heterogeneous in nature; being statistical mixtures of polymer chains representing a distribution of stereochemical microstructures, and some of these can be physically fractionated into multiple components. Furthermore, apart from some variation in the microstructure distributions that might be possible through control of monomer concentration, these strategies share the common distinction of being 'one catalyst, one material,' and therefore, access to the full range of isotactic-atactic stereoblock poly(olefin), and in particular PP, architectures that can be conceivably envisioned with respect to the length and distribution of stereoblock type remains out of reach. Finally, and perhaps most significantly, the mechanisms by which these isotactic-atactic stereoblock poly(olefin) materials are produced, as well as the exact nature of their microstructures, still remain either unclear or open to question (Gauthier, W. J. and Collins, S., *Macromolecules* 28:3779-3786 (1995); Busico, V.; et al., *J. Am. Chem. Soc.* 125:5451-5460 (2003)).

Manipulation of poly(olefin) stereochemical microstructure through ligand modifications of well-defined homogeneous Ziegler-Natta catalysts has provided a wealth of new materials; ranging from stiff or flexible plastics to elastomers (L. Resconi, L. Cavallo, A. Fait, F. Piemontesi, *Chem. Rev.* 100:1253 (2000); G. Müller, B. Rieger, *Prog. Polym. Sci.* 27:815 (2002); C. De Rosa, F. Auriemma, A. Di Capua, L. Resconi, S. Guidotti, I. Camurati, I E. Nifant'ev, I. P. Lashevtsev, *J. Am. Chem. Soc.* 126:17040 (2004)). However, the currently practiced 'one catalyst—one material' strategy has significant disadvantages and practical limitations for fine-tuning physical properties through either minor adjustments about a given microstructure, or for accessing a completely different microstructure altogether. Thus, not only is it a labor-intensive synthetic undertaking to prepare a large variety of catalyst structural variants that may, or may not, yield a desired microstructure, but even after several decades of effort, the 'rational design' of new catalysts that can produce a specific poly(olefin) microstructure is still out of reach; and even more so for non-metallocene based systems (see, for example: G. Talarico, V. Busico, L. Cavallo, *J. Am Chem. Soc.* 125:7172 (2003)).

Dynamic unimolecular processes that are competitive with propagation, such as site-isomerization in structurally constrained $C_1$-symmetric ansa-bridged metallocenes (D. T. Mallin, M. D. Rausch, Y. G. Lin, S. Dong, J. C. W. Chien, *J. Am. Chem. Soc.* 112:2030 (1990); J. C. W. Chien, G. H. Llinas, M. D. Rausch, G.-Y. Lin, H. H. Winter, *J. Am. Chem. Soc.* 113:8570 (1991); W. J. Gauthier, J. F. Corrigan, N. J. Taylor, S. Collins, *Macromolecules* 28:3771 (1995); W. J. Gauthier, S. Collins, *Macromolecules* 28:3779 (1995); A. M. Bravakis, L. E. Bailey, M. Pigeon, S. Collins, *Macromolecules* 31:1000, (1998); U. Dietrich, M. Hackmann, R. Bernhard, M. Kling a, M. Leskelä, *J. Am. Chem. Soc.* 121:4348 (1999); E. J. Thomas, C. W. J. Chien, M. D. Rausch, *Macromolecules* 33:1546 (2000); S. A. Miller, J. E. Bercaw, *Organometallics* 21:934 (2002)), conformational flexibility in unconstrained 'oscillating' metallocenes (G. W. Coates, R. M. Waymouth, *Science* 267:217 (1995); S. Lin, R. M. Waymouth, *Acc. Chem. Res.* 35:765, (2002)) and 'chain-end epimerization' (V. Volkis, E. Nelkenbaum, A. Lisovskii, G. Hasson, R. Semiat, M. Kapon, M. Botoshansky, Y. Eishen, M. S. Eisen, *J. Am. Chem. Soc.* 125:2179 (2003)) or ligand sphere rearrangements in non-metallocenes (E. Smolensky, M. Kapon, J. D. Woollins, M. S. Eisen, *Organometallics* 24:3255 (2005)), can give rise to poly(propylene) materials having properties that result from varying degrees and patterns of stereoerror incorporation, such as in the case of elastomeric poly(propylene). Due to the intrinsically low energy barriers associated with these unimolecular processes, however, to date, the only means available by which to exert some level of external control in order to access a wider range of microstructures for a given catalyst has been to capitalize on the bimolecular nature of propagation (olefin complexation) by varying propylene pressure, and hence, the rate of propagation, $R_p$, vs. that of the unimolecular process (U. Dietrich, M. Hackmann, R. Bernhard, M. Kling a, M. Leskelä, *J. Am. Chem. Soc.* 121:4348 (1999)).

There is a need, therefore, for new methods of producing poly(olefin) compositions having defined microstructure. And there is a need for new isotactic-atactic poly(olefin) compositions that exhibit elastomeric properties.

BRIEF SUMMARY OF THE INVENTION

In one embodiment, the present invention relates to a method of producing a multiblock, stereoblock polyolefin having substantially uniform microstructure comprising contacting a Ziegler-Natta pre-catalyst with a co-catalyst and an olefin to polymerize said olefin and form a first stereoblock, adding a methyl donator that changes the stereoregularity of the polymerization, and polymerizing said olefin to form a second stereoblock.

In another embodiment, the present invention relates to a method of producing an isotactic-atactic polyolefin composition having substantially uniform microstructure, comprising contacting a Ziegler-Natta pre-catalyst with a co-catalyst and a first olefin, polymerizing said first olefin to form a living isotactic poly(first olefin) block, contacting said living isotactic poly(first olefin) block with a methyl donator and a second olefin, and polymerizing said second olefin to form a living, atactic poly(second olefin) block. In another embodiment, said isotactic-atactic polyolefin composition has polydispersity index in the range of about 1.01 to about 1.2 and said isotactic poly(first olefin) block has (mmmm) pentad ratio in the range of about 0.73 to about 1.0.

In another embodiment, the present invention relates to a method of initiating degenerative transfer polymerization in a living Ziegler-Natta polyolefin polymerization, comprising contacting a methyl donator with a living polyolefin and olefin; and polymerizing said olefin by said degenerative transfer polymerization.

In another embodiment, the present invention relates to a method of producing a stereogradient poly(olefin) including contacting a Ziegler-Natta pre-catalyst with an olefin and a co-catalyst, wherein the amount of the co-catalyst activates a percentage of said Ziegler-Natta pre-catalyst, polymerizing the olefin to form a living poly(olefin) having a first stereo-defined microstructure, increasing the percentage of activated Ziegler-Natta pre-catalyst by adding co-catalyst over time or decreasing the percentage of activated Ziegler-Natta pre-catalyst by adding a methyl donator over a period of time and further polymerizing the olefin during the period of time to form a living poly(olefin) having a stereo gradient micro structure.

In another embodiment, the present invention relates to a method of introducing mr triad stereoerrors in a poly(olefin) polymerization, including contacting a first living poly(olefin) center with a methyl donor to render the first living poly(olefin) center configurationally unstable, contacting the configurationally unstable first living poly(olefin) center with a second living poly(olefin) center or co-catalyst to render the first living poly(olefin) center configurationally stable and contacting the configurationally stable first living poly(olefin) center with olefin to form a poly(olefin) having the rn stereoerror triad.

In another embodiment, the present invention relates to a method of polymerizing an olefin by degenerative transfer Ziegler-Natta polymerization, comprising contacting an activated Ziegler-Natta pre-catalyst with a methyl donor and an olefin, and polymerizing said olefin by degenerative transfer Ziegler-Natta polymerization.

In another embodiment, the present invention relates to a composition comprising elastomeric isotactic-atactic stereoblock poly(olefin) having substantially uniform microstructure produced by the methods of the present invention.

In another embodiment, the present invention relates to elastomeric poly(propylene) comprising a substantially uniform, monomodal, isotactic-atactic microstructure produced by the methods of the present invention.

In another embodiment, the present invention relates to a composition comprising isotactic-atactic stereogradient poly (olefin) having uniform microstructure.

In another embodiment, the present invention relates to a composition comprising atactic-isotactic stereogradient poly (propylene) having uniform microstructure and having a mmmm pentad transition from less than about 0.1 to greater than about 0.7.

BRIEF DESCRIPTION OF THE DRAWINGS/FIGURES

The accompanying drawings, which are included to illustrate exemplary embodiments of the invention and are incorporated in and constitute a part of this specification, illustrate embodiments of the invention and together with the description serve to explain the principles of the invention. In the drawings.

DETAILED DESCRIPTION OF THE INVENTION

Figure 1A:
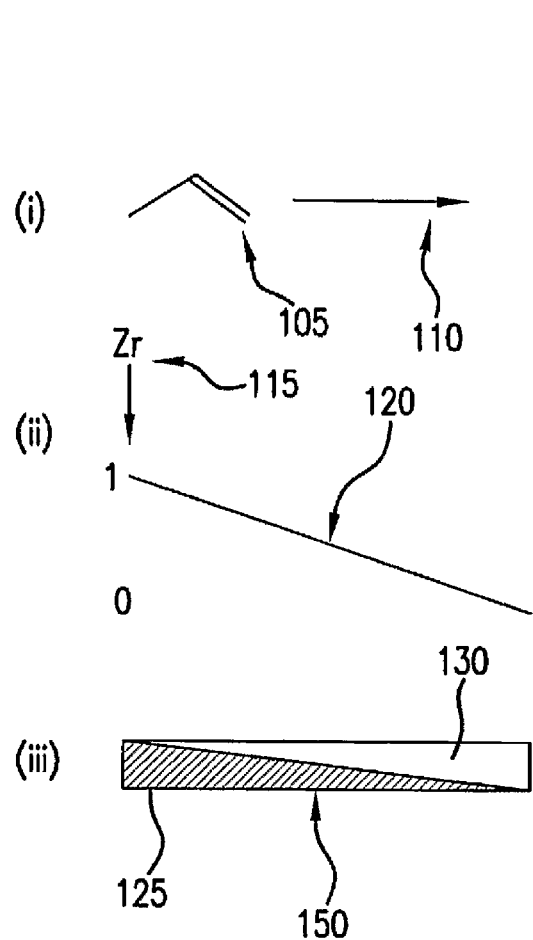
FIG. 1 is a graphic illustration of diblock and triblock stereogradient poly(olefin)s prepared in accordance with embodiments of the present invention.

Reference will now be made in detail to the embodiments of the present invention, examples of which are illustrated in the accompanying drawings and examples.

Definitions

As used herein, "alkyl" refers to straight- or branched-chain hydrocarbons having from 1 to 10 carbon atoms and more preferably 1 to 8 carbon atoms, including by way of example methyl, ethyl, propyl, iso-propyl, iso-butyl and tert-butyl.

"Bulky alkyl" is used herein to mean large, sterically hindering alkyl groups. Examples include branched or cyclic saturated hydrocarbon groups containing from 3 to 20 carbon atoms. Specific examples include, but are not limited to, iso-propyl, iso-butyl, sec-butyl, tert-butyl, neopentyl, tert-octyl, 2-ethylhexyl, cyclohexyl, cyclopentylmethyl, nor-bornyl, adamantyl, and the like.

"Aryl" by itself or as part of another group refers to monocyclic, bicyclic or tricyclic aromatic groups containing 6 to 14 carbon atoms in the ring position. Useful aryl groups include $C_{6-14}$ aryl, preferably $C_{6-10}$ aryl. Typical $C_{6-14}$ aryl groups include phenyl, naphthyl, indenyl, phenanthrenyl, anthracenyl, fluorenyl and biphenyl groups.

"Arylalkyl" refers to an alkyl group mentioned above substituted by a single aryl group including, by way of example, benzyl, phenethyl and naphthylmethyl.

"Cycloalkyl" refers to cyclic alkyl groups containing between 3 and 8 carbon atoms having a single cyclic ring including, by way of example, cyclopropyl, cyclobutyl, cyclopentyl, cyclooctyl and the like.

"Optionally substituted phenyl" refers to a phenyl ring which may contain 1 to 5 electron donating or electron withdrawing groups. By way of example, electron-donating groups include, but are not limited to amino, hydroxy, alkoxy, amide, aryl and alkyl. Examples of electron withdrawing groups include, but are not limited to, halo, ketone, ester, —$SO_3H$, aldehyde, carboxylic acid, cyano, nitro and ammonium.

"Alkylphenyl" refers to an alkyl group mentioned above substituted by a single phenyl group including, by way of example, benzyl, 1-phenethyl, 1-phenylpropyl, 1-phenylbutyl, 2-phenethyl, 2-phenylpropyl, 2-phenylbutyl, 3-phenylpropyl and 3-phenylbutyl.

"Halo" refers to fluoro, chloro, bromo and iodo.

"Aromatic ring" refers to an unsaturated carbocyclic group of 6 to 14 carbon atoms having a single ring (e.g., phenyl) or multiple condensed rings (e.g., naphthyl or anthryl).

"Substoichiometric amount" is used herein to mean an amount less than about an equivalent amount. For example, the Ziegler-Natta pre-catalyst and co-catalyst can be added together in a ratio of Ziegler-Natta pre-catalyst:co-catalyst in the range of about 1:1 to about 100:1. In an alternative example, the ratio is about 1.2:1, 1.5:1, 1.8:1, 2:1, 2.2:1, 2.5:1, 3:1, 4:1, 5:1, 10:1, 25:1, 50:1, 75:1 or 90:1. In an alternative example, the co-catalyst is added in an amount of about 1-5 mole % of the Ziegler-Natta pre-catalyst.

Modular Degenerative Transfer (DT) Polymerization

Referring to Scheme 1, in the methods of the present invention, the molecular weight, number, length, and placement of each stereoblock (e.g., n, m and x) can be programmed as desired to provide a wide range of different stereoblock architectures. By using these methods, new structurally distinct classes of isotactic-atactic stereoblock poly(olefin) thermoplastic elastomers are prepared.

Scheme 1

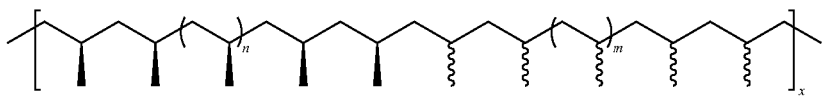

As shown in Scheme 2, activation of the neutral zirconium amidinate 1 through in situ methyl group protonolyis by the borate, $[PbNHMe_2][B(C_6F_5)_4]$ (2), provides the cationic zirconium species, $\{Cp*ZrMe[N(Et)C(Me)N(^tBu)]\}[B(C_6F_5)_4]$ ($Cp*=\eta^5-C_5Me_5$) (3), which has been shown to be a highly active initiator for the living isospecific polymerization of higher α-olefins, such as 1-hexene. Upon full 'activation' of (1) using a stoichiometric amount of (2), the living Ziegler-Natta polymerization of propylene and higher α-olefins, such as 1-hexene, is highly isotactic (mmmm=0.71, σ=0.94) for the former and isospecific (σ=1.0) for the latter with stereocontrol attained under exclusive enantiomorphic site control. (K. C. Jayaratne; L. R. Sita, *J. Am. Chem. Soc.* 122:958 (2000), M. B. Harney, Y. Zhang, L. R. Sita, *Angew. Chem., Int. Ed.* 45 (2006), in press), L. Resconi, L. Cavallo, A. Fait, F. Piemontesi, *Chem. Rev.* 100:1253 (2000)).

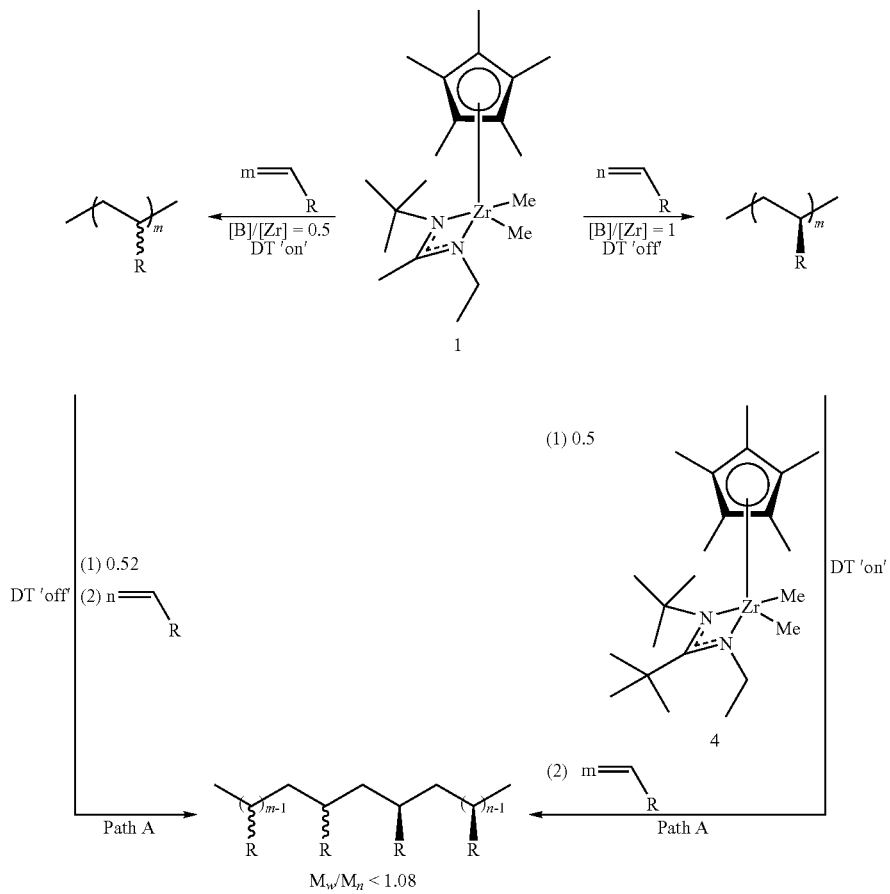

Scheme 2

[B] = [PhNHMe$_2$][B(C$_6$F$_5$)$_4$] (2)

The high degree of isoselectivity for propylene enchainment initiated by 3 is among the highest recorded for the living polymerization of propylene. (V. Busico, R. Cipullo, N. Friederichs, S. Ronca, G. Talarico, M. Togrou, B. Wang, Macromolecules 37:8201 (2004); A. F. Mason, G. W. Coates, J. Am. Chem. Soc. 126:16326 (2004)). Initiator 3 is unique among other known initiators of a stereoselective living Ziegler-Natta polymerization in that 3 does not require significant ligand modification to achieve a broad monomer specificity that ranges from propylene to higher α-olefins to α,ω-unconjugated dienes (K. C. Jayaratne, L. R. Sita, J. Am. Chem. Soc. 122:958 (2000); K. C. Jayaratne, R. J. Keaton, D. A. Henningsen, L. R. Sita, J. Am. Chem. Soc. 122:10490 (2000); R. J. Keaton, K. C. Jayaratne, D. A. Henningsen, L. A. Koterwas, L. R. Sita, J. Am. Chem. Soc. 123:6197 (2001)).

In addition, substoichiometric activation of 1 by 2 gives rise to degenerative transfer (DT) living Ziegler-Natta polymerization that proceeds through rapid and reversible methyl group transfer between active (cationic) and dormant (neutral) propagating centers (Zhang, Y., et al., J. Am. Chem. Soc. 125:9062-9069 (2003)). See Scheme 3, which illustrates the living nature of the degenerative transfer polymerization. Due to a dormant state that is configurationally unstable with respect to metal-centered epimerization that proceeds much faster than propagation, however, an atactic microstructure is produced, albeit one still of narrow polydispersity [Đ ($M_w/M_n$)<1.05]. (Đ=$M_w/M_n$) since Đ≈1+($k_p/k_{tr}$) and $k_{tr}$>>$k_p$ (A. H. E. Müller, R. Zhuang, D. Yan, G. Litvinenko, Macromolecules 28:4326 (1995)). These relative rates also ensure that the number average degree of polymerization ($X_n$) is a function of only the initial concentration of the preinitiator, not the amount of borate activator employed (i.e., $X_n$≈[M]/[1]$_0$). Thus, well-defined atactic-isotactic stereoblock diblock polyolefins of uniform molecular weight and block length were prepared according to Path A in Scheme 2 (Zhang, Y., et al., J. Am. Chem. Soc. 125:9062-9069 (2003); Nishii, K., et al., Macromol. Rapid Commun. 25:1029-1032 (2004)). See also U.S. application Ser. No. 10/740,826 to Sita, L. R., entitled "Process for Preparation of Polyolefins via Degenerative Transfer Polymerization," which is incorporated herein in its entirety for all purposes.

Scheme 3

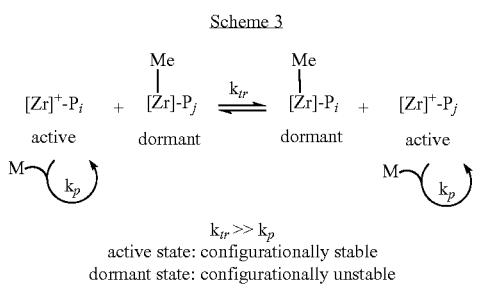

Modulated DT living Ziegler-Natta polymerization for the synthesis of multiblock isotactic-atactic stereoblock poly(propylene) has now been extended by turning DT back 'on' after it has been 'off' by introducing methyl groups back into the system through methylation of cationic propagating centers in a way that does not introduce a new species that is deleterious to either DT or subsequent non-DT living polymerizations.

Bimolecular Control and Controlled Stereoerror Insertions

In one embodiment, the present invention provides methods that break the 'one catalyst—one material' paradigm by controlling the dynamic bimolecular process within the well-defined two-state system composed of active (configurationally stable) and dormant (configurationally unstable) centers that interconvert through methyl group exchange. Importantly, since the evolution of microstructure in this system is a function of the frequency with which the growing polymer chain resides in the dormant state, it is possible to exert an unprecedented level of control in accessing virtually an unlimited number of discrete polyolefin microstructures that range from being highly isotactic to fully atactic as the result of predictable degrees of incorporation of stereoerrors of a known type. By taking advantage of the living nature of olefin polymerization in this system, the ability to overlay both temporal and bimolecular control as a means by which to prepare a fundamental new form, stereogradient poly(propylene), is demonstrated for which data showing stereochemical microstructural homogeneity is presented.

Bimolecular control during olefin polymerization allows for control over stereoerror incorporation. Scheme 4 shows a mechanism of stereoerror incorporation under degenerative transfer conditions. Since monomer enchainment remains highly stereoselective, the atactic microstructure is the product of the frequency with which the growing polymer chain visits the dormant state, where metal-centered epimerization occurs to provide one of two different diastereomeric propagating centers (with equal probability) upon exiting back to the active state. Accordingly, by directly manipulating the bimolecular rate of group transfer, $R_{tr}$, relative to the rate of propagation, $R_p$, which is pseudo-first order in the presence of a large excess of monomer, by simply changing either the absolute concentration of all the metal-containing species in solution or by changing the concentration of transferable methyl groups using different levels of substoichiometric activation, it is possible to influence the frequency of attaining the dormant state, and thereby, the stereochemical microstructure of the growing polymer chain.

Scheme 4

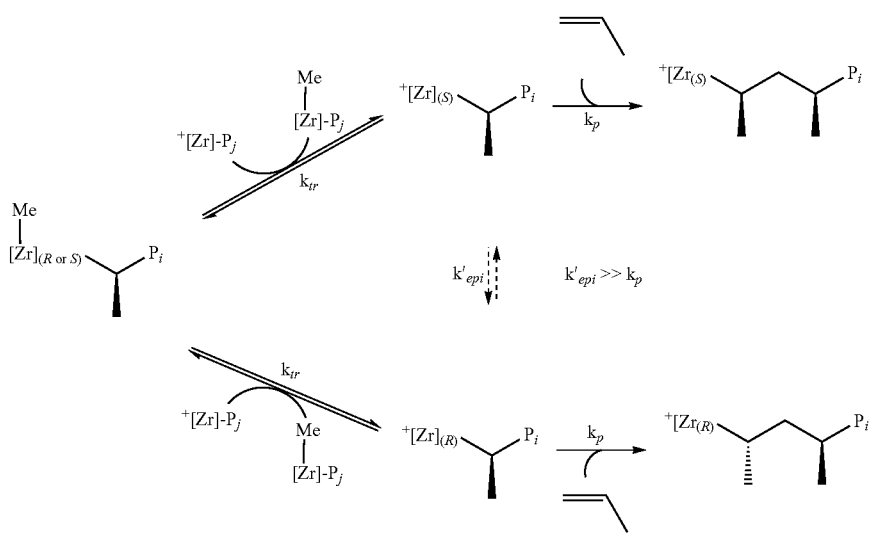

The above mechanism of stereoerror incorporation is of significant importance in that, until now, it has only been possible to introduce varying amounts of rr triad stereoerrors as a means of controlling poly(propylene) isotacticity by manipulating the degree of stereoselectivity for propylene enantioface complexation and subsequent insertion.

Scheme 5 shows a schematic representation for rr and mr triad stereoerror incorporation via classical mechanisms of site and chain end control, respectively. As shown more specifically in Scheme 5, while propagation via a 'chain-end control' mechanism that is dictated by the growing polymer chain can give rise to the type of isolated mr triad stereoerror observed here, no clear means exist in the art by which one could conceivable manipulate, over a wide range, the degree of chain-end control through modification of the ligand sphere of the catalyst. Accordingly, the present invention allows for the introduction of varying levels of mr triad stereoerrors in simple fashion using only a single precatalyst in combination with its co-catalyst. This is not only unique, but the range of new poly(olefin) materials, and in particular polypropylene materials, that are now obtainable by the present invention may possess technologically desirable physical properties.

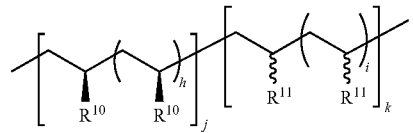

wherein h and i are independently zero or an integer between 1 and 10,000, j and k are independently an integer between 1 and 10,

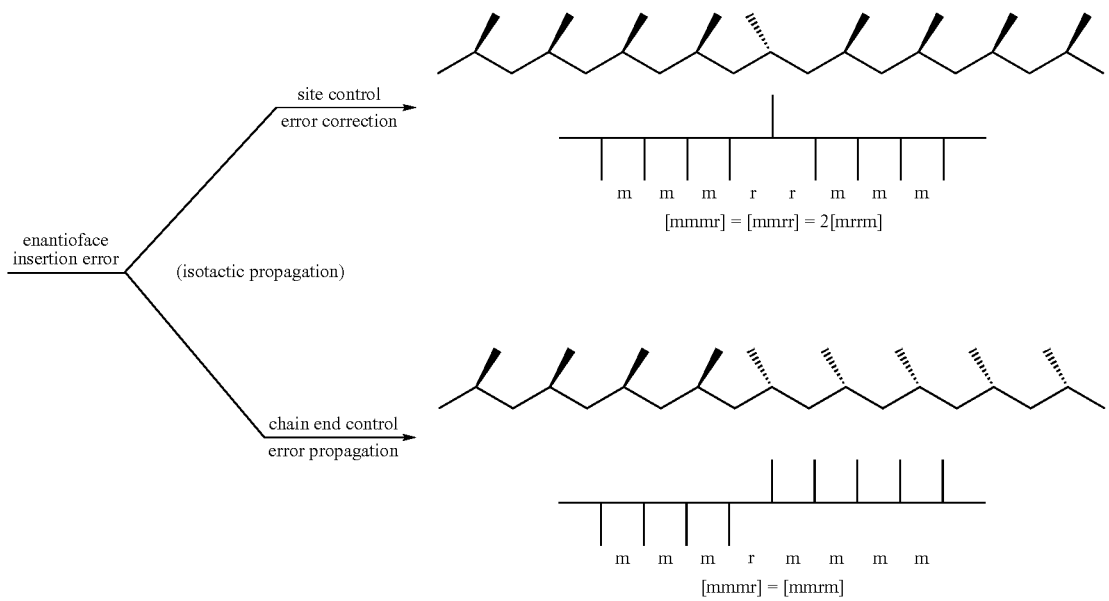

Additionally, for a given level of % activation, an alternative level of bimolecular control (i.e., 'fine-tuning') about a particular microstructure can be achieved by simply varying solvent volume, and hence, the absolute concentrations of the active and dormant species. As expected, isotacticity increases as the concentrations of these species decrease.

In addition to providing an unprecedented level of control over mr stereoerror incorporation, the present bimolecular control of stereochemical microstructure can be used to prepare a new fundamental form, stereogradient poly(propylene), by simply varying the concentration of the dormant species as a function of time. Importantly, this stereogradient poly(propylene) can only be produced using a living system since chain-transfer that occurs in non-living systems would produce stereochemical heterogeneity within the final isolated material.

Poly(Olefin) Compositions of the Present Invention and their Characterization

In an embodiment, therefore, the present invention relates to a composition comprising elastomeric isotactic-atactic stereoblock poly(olefin) having substantially uniform microstructure.

In another embodiment, the present invention relates to a composition comprising elastomeric isotactic-atactic stereoblock poly(olefin) having substantially uniform microstructure, wherein each poly(olefin) chain independently has the formula:

$R^{10}$ and $R^{11}$ are independently alkyl, cycloalkyl or optionally substituted phenyl, and the polydispersity of said poly(olefin) composition is about 1.01 to about 1.25.

In another embodiment, the present invention relates to a composition comprising isotactic-atactic stereogradient poly(olefin) having uniform microstructure. "Stereogradient poly(olefin)" is used herein to mean the stereochemical microstructure of the stereoblock poly(olefin), as defined by the relative stereochemical configurations of adjacent and nearest neighboring chiral centers (out to about 10-15 chiral centers on either side), changes from one microstructural type to another over a fixed length of the polymer chain.

The change in microstructure in the stereogradient poly(olefin)s of the present invention can be measured by the change in mmmm pentad analysis for different blocks of the poly(olefin). For example, the isotactic-atactic stereogradient microstructure includes a mmmm pentad transition from greater than about 0.7 to less than about 0.5 over a fixed length of chiral centers. In another example, the stereogradient microstructure includes a mmmm pentad transition from greater than about 0.7 to less than about 0.3 over a fixed length of chiral centers. In another example, the stereogradient microstructure includes a mmmm pentad transition from greater than about 0.7 to less than about 0.1 over a fixed length of chiral centers.

In one example, the fixed length is greater than about 2 chiral centers. In alternative examples, the fixed length is in the range of about 2 to about 50, about 5 to about 25, or about 10 to about 15 chiral centers. In yet another example, the fixed length is less than about 50 chiral centers. Many examples of stereogradient poly(olefin)s can be produced using the methods of the present invention, and the scope of the invention is not meant to be limited by any particular example.

In an embodiment, the stereogradient poly(olefin)s of the present invention comprise multiple blocks. For example, the stereogradient poly(olefin) compositions comprise diblock, triblock, tetrablock, pentablock hexablock, heptablock, octablock or nonablock stereogradient poly(olefin).

FIG. 1 illustrates two examples of stereogradient poly(olefin)s prepared according to embodiments of the present invention. In FIG. 1A(i), olefin 105 is polymerized and the progress of the polymerization 110 is shown below over time. In FIG. 1A(ii), Ziegler-Natta pre-catalyst 115 is added in about a stoichiometric amount to produce an isotactic poly (olefin) block 125, shown in FIG. 1A(iii). Over time, a methyl donor is steadily added to introduce increasing amounts of stereoerrors, such that at the end of polymerization, a fully atactic block 130 is produced as shown in FIG. 1A(iii). The steady decrease in tacticity 120, as a result of increasing methyl donor added is shown in FIG. 1A(ii). The resulting diblock stereogradient poly(olefin) 150 has unique microstructure that smoothly transitions from fully isotactic to fully atactic.

Figure 1B:
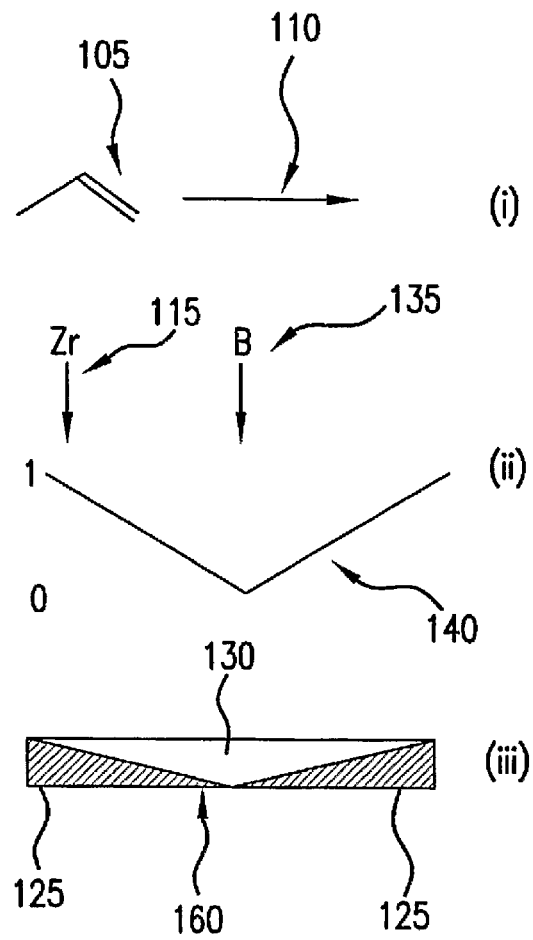

The second example is shown in FIG. 1B. In FIG. 1B(i), olefin 105 is polymerized and the progress of the polymerization 110 is shown below over time. In FIG. 1B(ii), Ziegler-Natta pre-catalyst 115 is added in about a stoichiometric amount to produce an isotactic poly(olefin) block 125, shown in FIG. 1B(iii). Over time, a methyl donor is steadily added to introduce increasing amounts of stereoerrors, such that at the midpoint of polymerization, a fully atactic block 130 is produced as shown in FIG. 1B(iii). Co-catalyst is then added steadily over time to increase the tacticity, such that at the end of polymerization, a fully isotactic block 125 is again produced. The tacticity profile 140 is shown in FIG. 1B(ii), which is a result of increasing methyl donor added to the midpoint, and increasing co-catalyst added until the end. The resulting triblock stereogradient poly(olefin) 160 has unique microstructure that has two smooth transitions, going first from fully isotactic to fully atactic, and second from fully atactic back to fully isotactic.

Olefins for use in the present invention include any olefin capable of being polymerized to form a poly(olefin) comprising an isotactic-atactic microstructure, including but not limited to isotactic-atactic stereoblock or stereogradient poly (olefin). Examples of olefins for use in the present invention include, but are not limited to ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, 4-methyl-1-pentene; a non-conjugated diene having the formula:

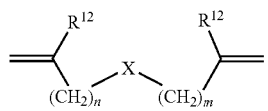

wherein X is $CH_2$, CO, $N(R^{13})$, O or S;
$R^{12}$ and $R^{13}$ are independently H, alkyl or phenyl; and
n and m are each independently an integer from 0-5;
oligomers thereof, polymers thereof, or mixtures thereof.

Microstructure as used herein, refers to the structure of the polymer at the monomer, oligomer and stereoblock levels, which includes the monomer structure and the stereoblock stereochemistry. Poly(olefin)s of the present invention have uniform microstructure. Preferably, the poly(olefin)s have substantially uniform microstructure. Substantially uniform microstructure means for a given composition, stereoblocks of the same tacticity have polydispersity in the range of about 1.01 to about 1.25, and no more than 1 in about 20 monomer units, for two given stereoblocks of the same tacticity from different polymer chains, have different structure or stereochemistry.

Poly(olefin) compositions of the present invention have narrow polydispersities (D) in the range of about 1.01 to about 1.25, alternatively in the range of about 1.01 to about 1.45. Polydispersity may be determined using any method known to one of ordinary skill in the art. For example, the ratio of $M_w/M_n$ may be used. Methods for determining this ratio are well known in the art. For example, GPC may be used.

The term "about" is used herein to mean the given number plus or minus about 10%.

Stereoblock is used herein to mean a block poly(olefin) having stereoregular and optionally non-stereoregular blocks. Stereoregular is used herein to mean a poly(olefin) block having essentially only one species of stereorepeating units. Examples include, but are not limited to, isotactic, and syndiotactic stereorepeating units. Examples of non-stereoregular blocks include atactic blocks. Alternative examples of non-stereoregular blocks include those blocks having greater than about 0.5%, 1%, 1.5%, 2%, 3% 4%, 5%, 6%, 7%, 8%, 9%, 10%, 15%, 20%, 25%, 30%, 35%, 40%, 45%, 50%, 55%, 60%, 70% 80% or 90% stereoerrors.

Two adjacent configurational base units in a given polymer chain are diads, three are triads, four are tetrads, five are pentads, and so on. Isotactic diads are also known as meso diads (m). Isotactic triads are symbolized as (mm) and are made of two isotactic diads. Isotactic pentads are also known as meso pentads (mmmm). The isotactic pentad ratio is a common measure of a stereoblock's isotacticity. The isotactic pentad ratio, or (mmmm), is the fraction of meso pentads in a given stereoblock or stereopolymer. The pentad ratio is a measure of a polymerization's stereocontrol. (Coates, G. W. and Waymouth, R. M., *Science,* 267:217-219 (1995)). When two adjacent substituents are on opposite sides of the polymer backbone, the diad is known as a racemo diad (r). Racemo triads are symbolized as (rr). Heterotactic triads are made of one meso diad (m) and one racemo diad (r), and can be symbolized as (rm) or (nr). In an isotactic polymerization, heterotactic triads and racemo triads are referred to as stereoerrors. Heterotactic triad stereoerrors can be either a (rm) or (mr) stereoerrors, and racemo triad stereoerrors are (rr) stereoerrors.

The polymerizations of the present invention have high stereocontrol. Isotactic stereoblocks of the present invention have high isotactic pentad ratios (mmmm) in the range of about 0.7 to about 1.0. Isotactic pentad ratios (mmmm) can be measured using any method known to one of ordinary skill in the art. For example, nuclear magnetic resonance (NMR) spectroscopy is used. Preferably, $^{13}C$ NMR is used to measure a poly(olefin) pentad ratio. (Brintzinger, H. H., et al., *Angew. Chem. Int. Ed. Engl.,* 34:1143-1170 (1995)).

The presence of stereoerrors are another measure of the stereocontrol of a polymerization. There are a variety of types of stereoerrors, including (2,1)-insertions and (1,3)-insertions. (Brintzinger, H. H., et al., *Angew. Chem. Int. Ed. Engl.*, 34:1143-1170 (1995)). In stereoregular polymerizations, another form of stereoerrors are rr and mr triad stereoerrors, discussed above and illustrated in Scheme 5. Polymerizations of the present invention allow for the controlled insertion of mr triad stereoerrors.

In an embodiment, polymerizations of the present invention produce isotactic stereoblocks having less than about 0.1 to about 0.5% (2,1)-misinsertions and (1,3) misinsertions were not detectable. In another embodiment, polymerizations of the present invention produce non-stereoregular stereoblocks having a predictable and controlled amount of mr triad stereoerrors. As an example, non-stereoregular stereoblocks have 0.5%, 1%, 1.5%, 2%, 3% 4%, 5%, 6%, 7%, 8%, 9%, 10%, 15%, 20%, 25%, 30%, 35%, 40%, 45%, 50%, 55%, 60%, 70% 80% or 90% mr triad stereoerrors. The amounts of stereoerrors in a stereoregular or non-stereoregular poly(olefin) can be measured using any method known to one of ordinary skill in the art. Preferably, $^{13}$C NMR and $^1$H NMR are used. For reviews of the use of $^{13}$C NMR for stereochemical microstructural analysis of poly(propylene), see L. Resconi, L. Cavallo, A. Fait, F. Piemontesi, *Chem. Rev.* 100:1253 (2000) and V. Busico, R. Cipullo, *Prog. Polym. Sci.* 26:443 (2001).

The phrase "block length" is used herein to refer to the length, or number or repeating units, of a given stereoblock in the poly(olefin)s of the present invention. The length of a given stereoblock can be determined relative to its molecular weight. In one embodiment, the block length for a given stereoblock of the poly(olefin)s of the present invention is substantially the same between all polymer chains for a given composition. "Substantially same block length" is used herein to mean that stereoblocks of the present invention have polydispersities less than about 1.45 or 1.25, and preferably less than about 1.1. In the polymerizations of the present invention, block length can be pre-determined by a number of methods, including but not limited to, polymerization time, reactant concentrations and monomer pressures. In one example, polymerization time is used to determine block length.

In an embodiment, polymerization methods of the present invention are flexible and allow for the manufacture of poly(olefin) compositions having various molecular weights. The molecular weights that are given, therefore, are not meant to be limiting. For example, poly(olefin) compositions of the present invention have number average molecular weight ($M_n$) greater than about 1,000. More particularly, the poly(olefin) compositions have number average molecular weight of about 1,000 to about 5,000,000. Methods for determining number average molecular weight of poly(olefin) compositions are well known to one of ordinary skill in the art. For example gel-permeation chromatography (GPC) may be used.

In another embodiment, the methods of the present invention also allow for the production of isotactic-atactic poly(olefin)s in which each block has different molecular weight. For example, depending on the desired physical and mechanical properties, the level of isotactic stereoblocks in a given composition can vary. In a specific example, for elastomeric poly(olefin) compositions, the isotactic content is about 10 to about 40%.

In another embodiment, poly(olefin) compositions of the present invention have monomodal molecular weight distributions. "Monomodal molecular weight distribution" is used herein to mean a poly(olefin) composition having substantially a single molecular weight distribution, which means more than one molecular weight distribution is not detectable. Methods for measuring molecular weight distributions of poly(olefin) compositions are well known to one of ordinary skill in the art. Any method can be used. Preferably, GPC is used.

In another embodiment, the poly(olefin) compositions of the present invention comprise diblock, or alternatively, multiblock isotactic-atactic poly(olefin)s, including, but not limited to triblock, butablock, pentablock, hexablock, heptablock, octablock, nonablock or decablock stereoblock poly(olefin)s. Multiblock stereoblock poly(olefin)s of the present invention comprise any variety of alternating isotactic stereoblocks and atactic stereoblocks. In one example, the poly(olefin) compositions of the present invention comprise stereogradient poly(olefin). For example, poly(olefin) compositions of the present invention comprise isotactic-atactic-isotactic triblock stereoblock poly(olefin), a specific example of which is isotactic-atactic-isotactic triblock stereoblock poly(propylene). In another example, poly(olefin) compositions of the present invention comprise isotactic-atactic-isotactic-atactic-isotactic pentablock stereoblock poly(olefin), a specific example of which is iso-poly(1-octene)-α-poly(1-hexene)-iso-poly(1-octene)-α-poly(1-hexene)-iso-poly(1-octene).

In another embodiment, the present invention relates to a composition comprising elastomeric isotactic-atactic triblock stereoblock poly(olefin) having substantially uniform microstructure, wherein each poly(olefin) chain independently has the formula:

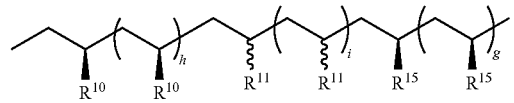

wherein g, h and i are independently zero or an integer between 1 and 10,000, $R^{10}$, $R^{11}$ and $R^{15}$ are independently alkyl, cycloalkyl or optionally substituted phenyl, and the polydispersity of said poly(olefin) composition is about 1.01 to about 1.25.

The isotactic-atactic microstructure of the poly(olefin) of the present invention results in poly(olefin) that undergoes microphase separation. Microphase separation is a phenomenon unique to polymers having at least two distinct compositions (i.e. copolymers), and is well known in the art. See, e.g., Bates, F. S, and Fredrickson, G. H., *Physics Today* February, 1999, pages 32-38. Microphase separation occurs in the poly(olefin) compositions of the present invention due to the incompatibility of the highly crystalline isotactic and non-crystalline atactic blocks. Multiblock stereoblock isotactic-atactic poly(olefin) of the present invention may phase separate to form rod-like nanostructures. The nanostructures have lengths of about 100 to about 1000 nm and widths of about 1 to about 50 nm. Microphase separation can be measured using any method known to one of ordinary skill in the art. For example, phase-sensitive tapping mode atomic force microscopy (ps-tm AFM) may be used.

In another embodiment, the present invention relates to monomodal elastomeric isotactic-atactic stereoblock poly(propylene) having substantially uniform microstructure. The isotactic-atactic poly(propylene) of the present invention has polydispersity index of about 1.01 to about 1.25. The isotactic-atactic poly(propylene) has a number average molecular weight of about 1,000 to about 5,000,000.

In another embodiment, the present invention relates to monomodal elastomeric isotactic-atactic stereoblock poly(propylene) having substantially uniform microstructure, wherein each poly(propylene) chain independently has the formula:

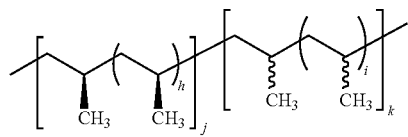

wherein h and i are independently an integer between 0 and 10,000, and
j and k are independently an integer between 1 and 10, and
the polydispersity of said poly(propylene) chains is about 1.01 to about 1.25.

The poly(propylene) of the present invention may be prepared having any number of stereoblocks, as long as the resulting stereoblock poly(propylene) has isotactic-atactic microstructure. For example, the poly(propylene) of the present invention may be isotactic-atactic diblock, triblock, butablock, pentablock, hexablock, heptablock, octablock, nonablock or decablock stereoblock poly(propylene).

The isotactic-atactic microstructure of the poly(propylene) of the present invention exhibits elastomeric properties. Isotactic-atactic poly(propylene) of the present invention may have an ultimate elongation to break of about 1000 to about 1500%, alternatively from about 900% to about 1700%. The residual elongation of the poly(propylene) may be less than about 5% after a strain of about 150 to about 250%. In on example, no irreversible deformation takes place after a strain in the range of 300%.

The isotactic-atactic poly(propylene) of the present invention exhibits a single melting point and a single crystallization point. The single melting point and crystallization point is evident of the substantially uniform isotactic-atactic microstructure. Melting and crystallization points of the poly(olefin) compositions of the present invention can be determined using any method known to one of ordinary skill in the art. For example, Differential Scanning Calorimetry (DSC) may be used.

The amount of isotacticity in a given poly(propylene) of the present invention can vary based on the desired properties of the final poly(propylene). For example, the isotactic-atactic stereoblock poly(propylene) of the present invention may comprise isotactic content in the range of about 10 to about 40%. This results in poly(propylene) exhibiting elastomeric properties.

The isotactic-atactic stereoblock poly(propylene) of the present invention comprises isotactic stereoblocks having high isotactic pentad ratios. For example, isotactic-atactic poly(propylene) of the present invention may have (mmmm) pentad ratio of about 0.70 to about 0.75.

The isotactic-atactic microstructure of the poly(propylene) of the present invention results in poly(propylene) that undergoes microphase separation. Multiblock stereoblock isotactic-atactic poly(propylene) of the present invention phase separate to form rod-like nanostructures. The nanostructures may have lengths of about 100 to about 1000 nm and widths of about 1 to about 50 nm. Microphase separation can be measured using any method known to one of ordinary skill in the art. For example, phase-sensitive tapping mode atomic force microscopy (ps-tm AFM) may be used.

In another embodiment, the present invention relates to monomodal, isotactic-atactic-isotactic poly(propylene) having substantially uniform microstructure.

In another embodiment, the present invention relates to monomodal, isotactic-atactic-isotactic poly(propylene) having substantially uniform microstructure, wherein each poly(propylene) chain independently has the formula:

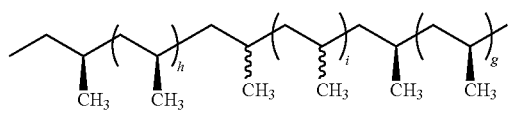

wherein g, h and i are independently an integer between 0 and 10,000, and
the polydispersity of said poly(propylene) chains is about 1.01 to about 1.25.

In another embodiment, the present invention relates to a composition comprising atactic-isotactic stereogradient poly(propylene) having uniform microstructure and having a mmmm pentad transition from less than about 0.1 to greater than about 0.7.

Methods for Olefin Polymerization

In another embodiment, the present invention relates to a method of producing a multiblock, stereoblock polyolefin having substantially uniform microstructure comprising contacting a Ziegler-Natta pre-catalyst with a co-catalyst and an olefin to polymerize said olefin and form a first stereoblock, adding a methyl donor that changes the stereoregularity of the polymerization and polymerizing said olefin to form a second stereoblock. Optionally, the polymerization is quenched by adding a protic solvent. Protic solvents for use in the present invention include any protic solvent capable of quenching or stopping a Ziegler-Natta type polymerization. Examples include, but are not limited to, water, alcohols and mixtures thereof. Specific alcohols include, but are not limited to, methanol, ethanol and isopropanol. The protic solvents may be acidified with a mineral or other protic acid, such as sulfuric acid, hydrochloric acid, nitric acid, or the like.

Any Ziegler-Natta pre-catalyst can be used in the present invention, as long as it can be activated to polymerize olefins, the polymerization is stereospecific in the presence of about a stoichiometric amount of co-catalyst and the polymerization becomes non-stereospecific when contacted with a methyl donor of the present invention. Specific examples of Ziegler-Natta pre-catalysts for use in the present invention include those having the formula:

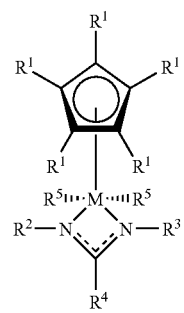

wherein the dotted lines indicate a delocalized bond;
M is Ti, Zr or Hf;

each $R^1$ is independently hydrogen, alkyl, cycloalkyl, optionally substituted phenyl or two adjacent $R^1$ form an aromatic ring;

$R^2$, $R^3$ and $R^4$ are independently alkyl, cycloalkyl, Si(alkyl)$_3$, Si(aryl)$_3$, optionally substituted phenyl, or alkylphenyl;

each $R^5$ is halo, alkyl, cycloalkyl, aryl or arylalkyl; and said optional substituents on phenyl are amino, hydroxy, alkoxy, amide, aryl, alkyl, halo, ketone, ester, —SO$_3$H, aldehyde, carboxylic acid, cyano, nitro and ammonium.

One specific example of a Ziegler-Natta pre-catalyst for use in the present invention is 1,2,3,4,5-pentamethylcyclopentadienyl dimethyl zirconium (N-ethyl-N-tbutyl-2-methyl)amidinate (3).

Co-catalysts for use in the present invention can be any co-catalyst capable of activating the Ziegler-Natta pre-catalyst. Examples include MAO-type co-catalysts or boron-containing co-catalysts. Particular examples of co-catalysts include those of the formulae:

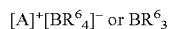

[A]$^+$[BR$^6_4$]$^-$ or BR$^6_3$ wherein A$^+$ is Si(R$^7$)$_3$, a cationic Lewis acid or a cationic Brønsted acid;

B is the element boron;

R$^6$ is alkyl or optionally substituted phenyl;

each R$^7$ is independently selected from alkyl and optionally substituted phenyl; and said optional substituents on phenyl are alkoxy, amino, amide, aryl, alkyl, halo, ketone, ester, —SO$_3$H, aldehyde, carboxylic acid, cyano, nitro and ammonium.

One specific example of a co-catalyst for use in the present invention is [PhNMe$_2$H][B(C$_6$F$_5$)$_4$].

In another embodiment, the pre-catalyst can be contacted with any amount of co-catalyst, so long as the resulting activated Ziegler-Natta pre-catalyst polymerizes the olefin stereospecifically. For example, the Ziegler-Natta pre-catalyst is contacted with about a stoichiometric amount of co-catalyst, and the resulting polymerization is stereospecific. In a more specific example, a stoichiometric amount of co-catalyst is used and the resulting stereospecific polymerization forms a first stereoblock which is isotactic.

Adding the methyl donor to the polymerization changes the stereospecificity of the polymerization. For example, adding the methyl donor changes the polymerization from a stereoregular to a non-stereoregular polymerization.

In another embodiment, the methyl donor can be added in any amount, as long as the stereospecificity of the polymerization is changed and the resulting polymerization is a living polymerization. For example, the methyl donor is added in an amount of about 10-50 mole % of the Ziegler Natta pre-catalyst. Less than about 10% of the methyl donor would not be added because the stereoregularity of the polymerization would not sufficiently change. After addition of the methyl donor, the resulting polymerization is a living non-stereospecific polymerization. For example, the non-stereoregular polymerization forms the second atactic stereoblock, and the resulting poly(olefin) composition comprises a poly(olefin) having an isotactic-atactic microstructure.

Any methyl donor can be used in the present invention as long as it does not catalyze the polymerization of olefins and changes the stereoregularity of the living polymerization. Examples of methyl donors for use in the present invention have the formula

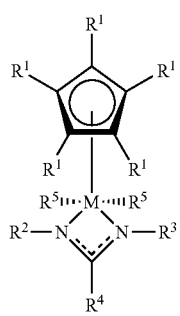

wherein the dotted lines indicate a delocalized bond;

M is Ti, Zr or Hf;

each $R^1$ is independently alkyl, cycloalkyl, optionally substituted phenyl or two adjacent $R^1$ form an aromatic ring;

$R^2$, $R^3$ and $R^4$ are independently bulky alkyl, cycloalkyl, Si(alkyl)$_3$, Si(aryl)$_3$, optionally substituted phenyl, or alkylphenyl;

each $R^5$ is methyl; and said optional substituents on phenyl are amino, hydroxy, alkoxy, amide, aryl, alkyl, halo, ketone, ester, —SO$_3$H, aldehyde, carboxylic acid, cyano, nitro and ammonium;

wherein said methyl donor does not catalyze the polymerization of said olefin.

More specific examples of methyl donors for use in the present invention are those in the formula above wherein R$_1$ is methyl, one of R$_2$ and R$_3$ is tert-butyl, R$_4$ is tert-butyl, and R$_5$ is methyl.

One specific example of a methyl donor for use in the present invention is 1,2,3,4,5-pentamethylcyclopentadienyl dimethyl zirconium (N-ethyl-N-$^t$butyl-2-$^t$butyl)amidinate (4).

Referring to Scheme 6 the significant steric strain inherent in compound 4 is relieved through irreversible methyl group transfer to either cationic 3, as determined by $^1$H NMR, or more critically, to cationic propagating centers. This methyl group donation turns DT "on," and changes the polymerization to a non-stereoregular polymerization, when a substoichiometric amount of 4 is added relative to initially used 1. Critically, the new cationic species derived from this methyl group donation by 4, {Cp*ZrMe[N(Et)C($^t$Bu)-N($^t$Bu)]}[B(C$_6$F$_5$)$_4$] (5), is inactive for olefin polymerization due to significant steric crowding about the metal (Zhang, Y., et al., Organometallics 23:3512-3520 (2004)).

Scheme 6

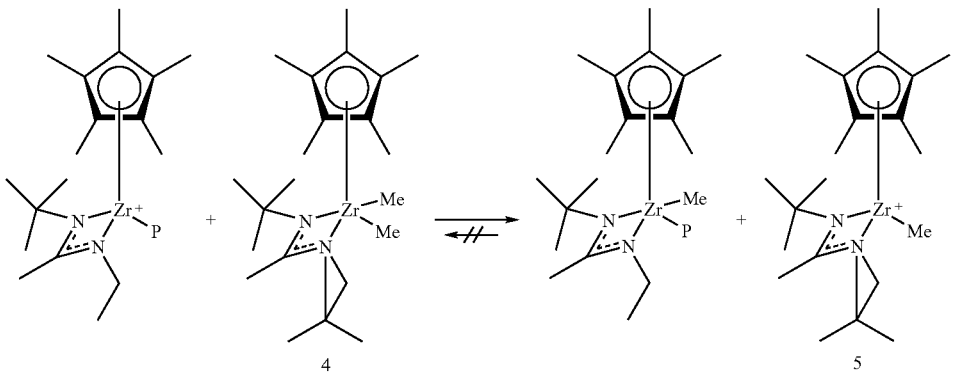

P=polymer chain, borate counterion not shown

Referring back to Scheme 2, isotactic-atactic stereoblock diblock polyolefins prepared by Path B of Scheme 2 using 4 are indistinguishable from those prepared by Path A; which serves to establish 5 as an innocent bystander during living polymerizations.

The methods of the present invention allow for the production of a wide range of poly(olefin)s having the isotactic-atactic microstructure. The methods of the present invention are not limited by the selection of olefin.

Therefore, multiblock poly(olefin)s can be produced comprising two or more different poly(olefin) blocks. For example, a second, different olefin can be added after the polymerization of the first poly(olefin) stereoblock, to form the second poly(olefin) stereoblock. The resulting poly(olefin) composition comprises isotactic poly(first olefin)-atactic-poly(second olefin).

The polymerizations of the present invention are living poly(olefin) polymerizations, and therefore, the production of multiblock poly(olefin) compositions is possible by the continued addition of olefin. After the formation of the second stereoblock poly(olefin), adding co-catalyst changes the stereospecificity of the polymerization to a stereoregular polymerization, while maintaining its living character. The co-catalyst can be added in any amount, so long as the resulting polymerization is stereospecific and living. Optionally, a third olefin is also added. The third olefin can be different than the first and second olefins, or alternatively, the third olefin is the same as the first olefin. After addition of the co-catalyst, the polymerization is continued to form a third stereoblock poly(olefin). For example, the polymerization is continued to form a third isotactic stereoblock. In a specific example, the resulting poly(olefin) composition comprises isotactic-atactic-isotactic triblock poly(olefin).

The steps of adding a methyl donor, polymerizing olefin, adding co-catalyst and polymerizing olefin can then be repeated one, two, three, four or five times to form higher multiblock poly(olefin) compositions having isotactic-atactic microstructure. In a specific example, the steps are repeated one time to form a pentablock stereoblock poly(olefin) composition comprising an isotactic-atactic-isotactic-atactic-isotactic poly(olefin).

In another embodiment, the present invention relates to a method of producing an isotactic-atactic polyolefin composition having substantially uniform microstructure comprising contacting a Ziegler-Natta pre-catalyst with a co-catalyst and a first olefin polymerizing the first olefin to form a living isotactic poly(first olefin) block, contacting the living isotactic poly(first olefin) block with a methyl donor and a second olefin, and polymerizing the second olefin to form a living, atactic poly(second olefin) block, whereby the isotactic-atactic polyolefin composition has polydispersity index in the range of about 1.01 to about 1.2 and the isotactic poly(first olefin) block has (mmmm) pentad ratio in the range of about 0.73 to about 1.0.

In a specific example, the isotactic-atactic polyolefin composition having substantially uniform microstructure comprises isotactic-atactic poly(propylene).

In another embodiment, the present invention relates to a method of initiating degenerative transfer polymerization in a living Ziegler-Natta polyolefin polymerization, comprising contacting a methyl donor with a living polyolefin and olefin; and polymerizing said olefin by said degenerative transfer polymerization.

To illustrate the flexibility of the methods of the present invention, the programmed synthesis of the isotactic-atactic poly(1-hexene)-poly(1-octene) pentablock stereoblock polyolefin 6 [$M_n$=26 400, D=1.08], shown in Scheme 7, was conducted in sequential fashion using appropriate amounts of 2 and 4 after polymerization of each monomer amount.

Scheme 7

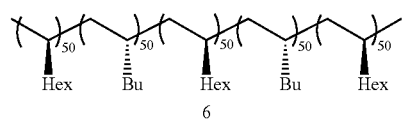

Figure 2:
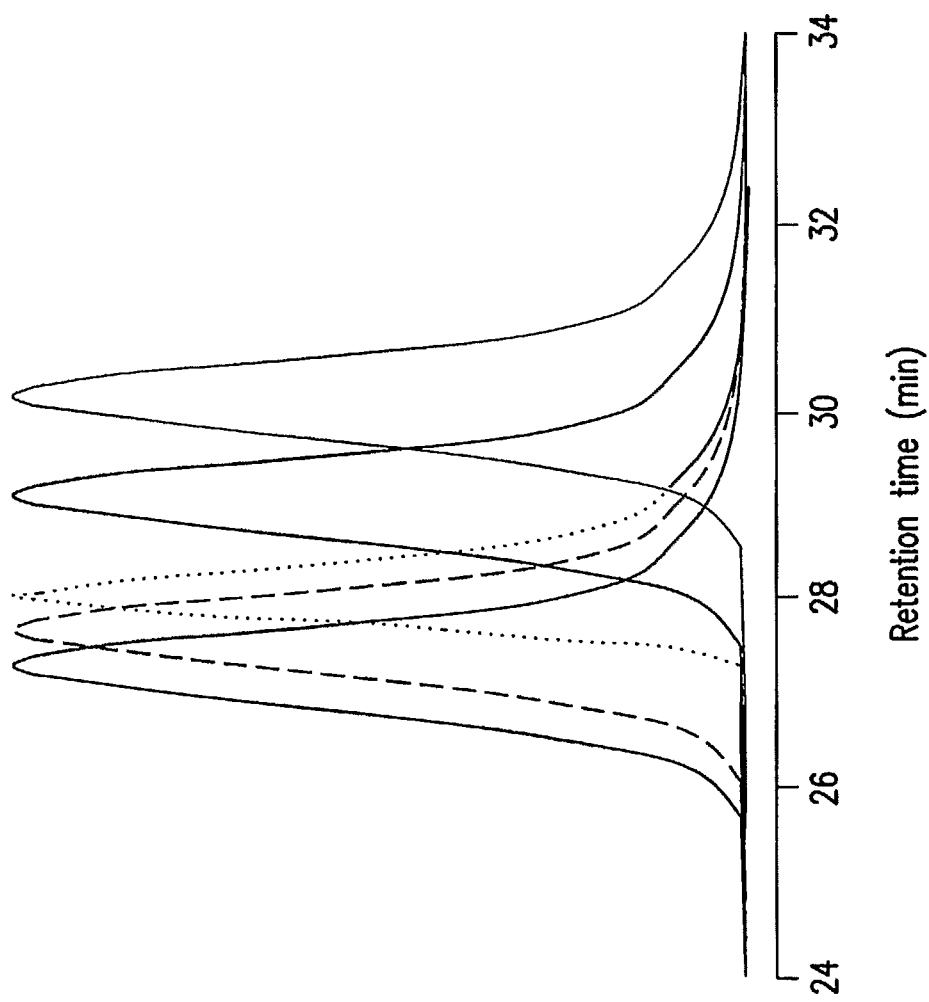
FIG. 2 is the GPC chromatograms for aliquots taken from a synthesis of a pentablock poly(olefin).

FIG. 2 shows GPC chromatograms for aliquot taken during the synthesis of the pentablock poly(olefin), and confirms the monomodal molecular weight distribution with narrow polydispersity.

Figure 3:
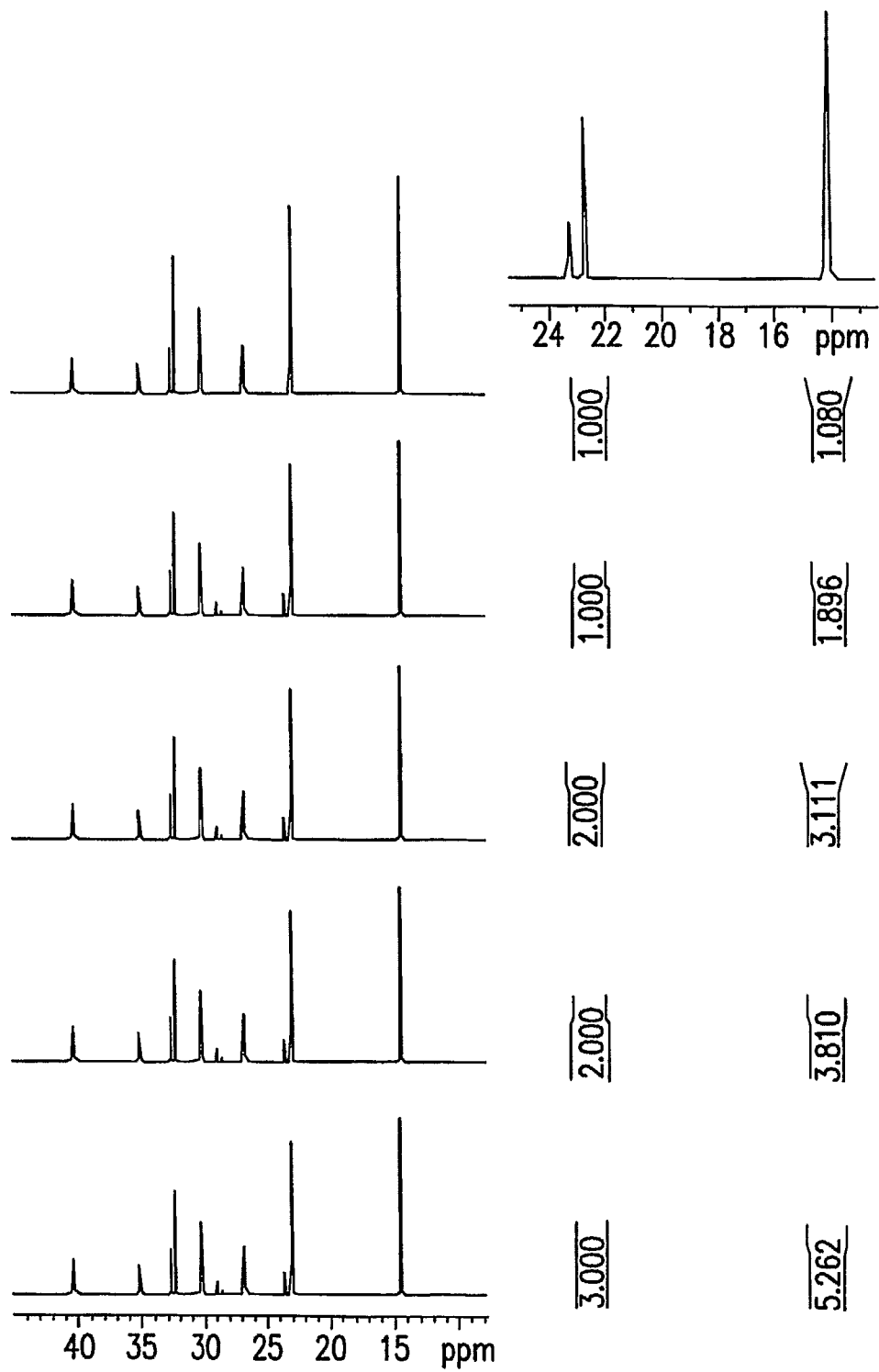
FIG. 3 is the inverse-gated $^{13}C\{^1H\}$ Nuclear Magnetic Resonance ("NMR") spectra of aliquots taken from a synthesis of a pentablock poly(olefin).

As shown in FIG. 3, inverse-gated $^{13}C\{^{1}H\}$ NMR spectroscopy (100 MHz, CDCl$_3$, 25° C.) of aliquots taken after each step of the synthesis unequivocally establish that the desired stereoblock ratios were being established as planned. The integration ratios for each block are given.

Figure 4:
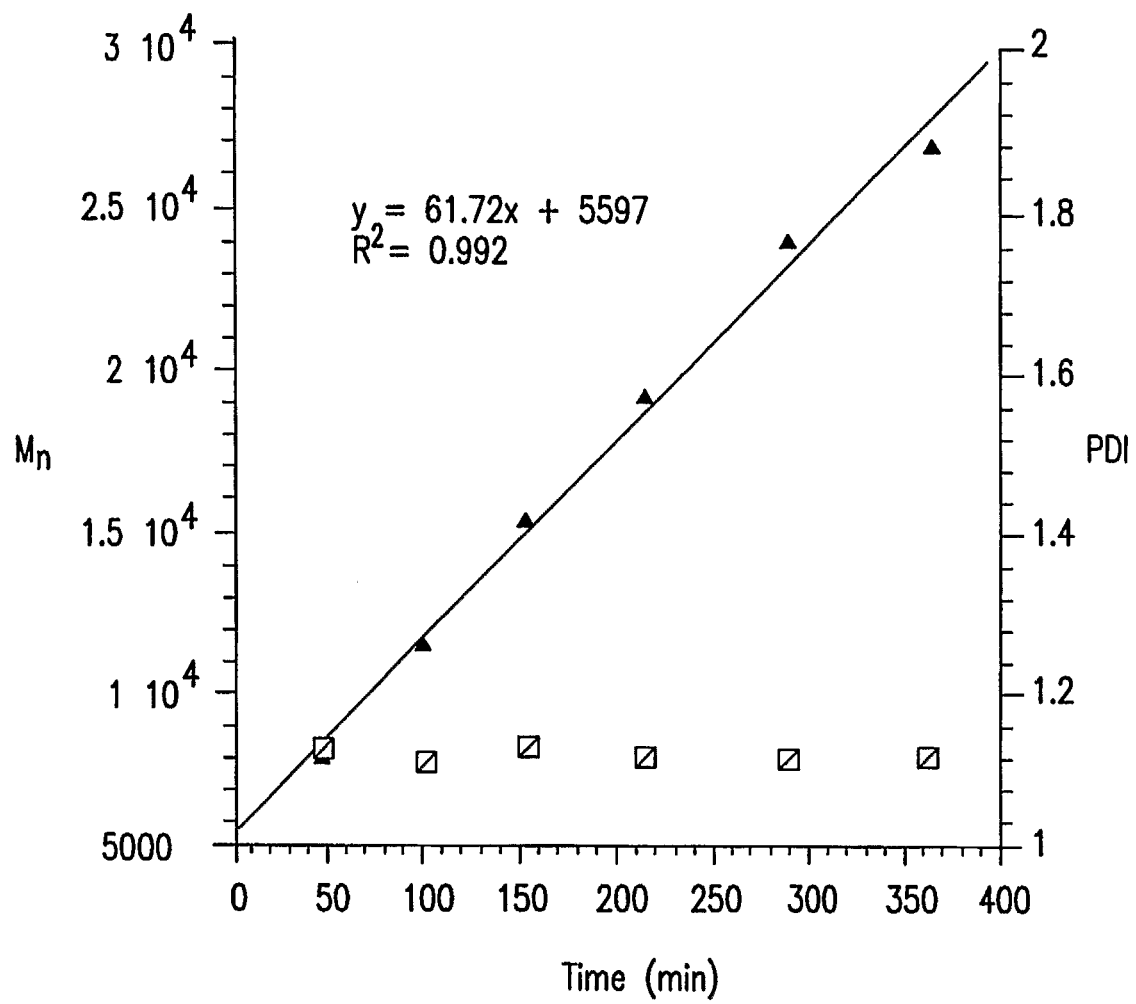
FIG. 4 is a graphic analysis of the kinetics of the polymerization of propylene under degenerative transfer conditions.

The synthesis of isotactic-atactic stereoblock poly(propylene) according to Scheme 2 was also accomplished, under DT and non-DT conditions respectively, in living fashion and with narrow polydispersities. Polymerization of propylene (5 p.s.i. or 34.5 kPa) at −10° C. in chlorobenzene under DT and non-DT conditions (i.e., initial 1:2=2:1 and 1:1, respectively) proceeded in the desired living and stereoselective fashion in each case. As shown in FIG. 4, fractions sampled from the polymerization of propylene under DT conditions show a linear dependence of molecular weight on the time of polymerization. The fractions also have constant polydispersity of less than about 1.15.

Figure 5:
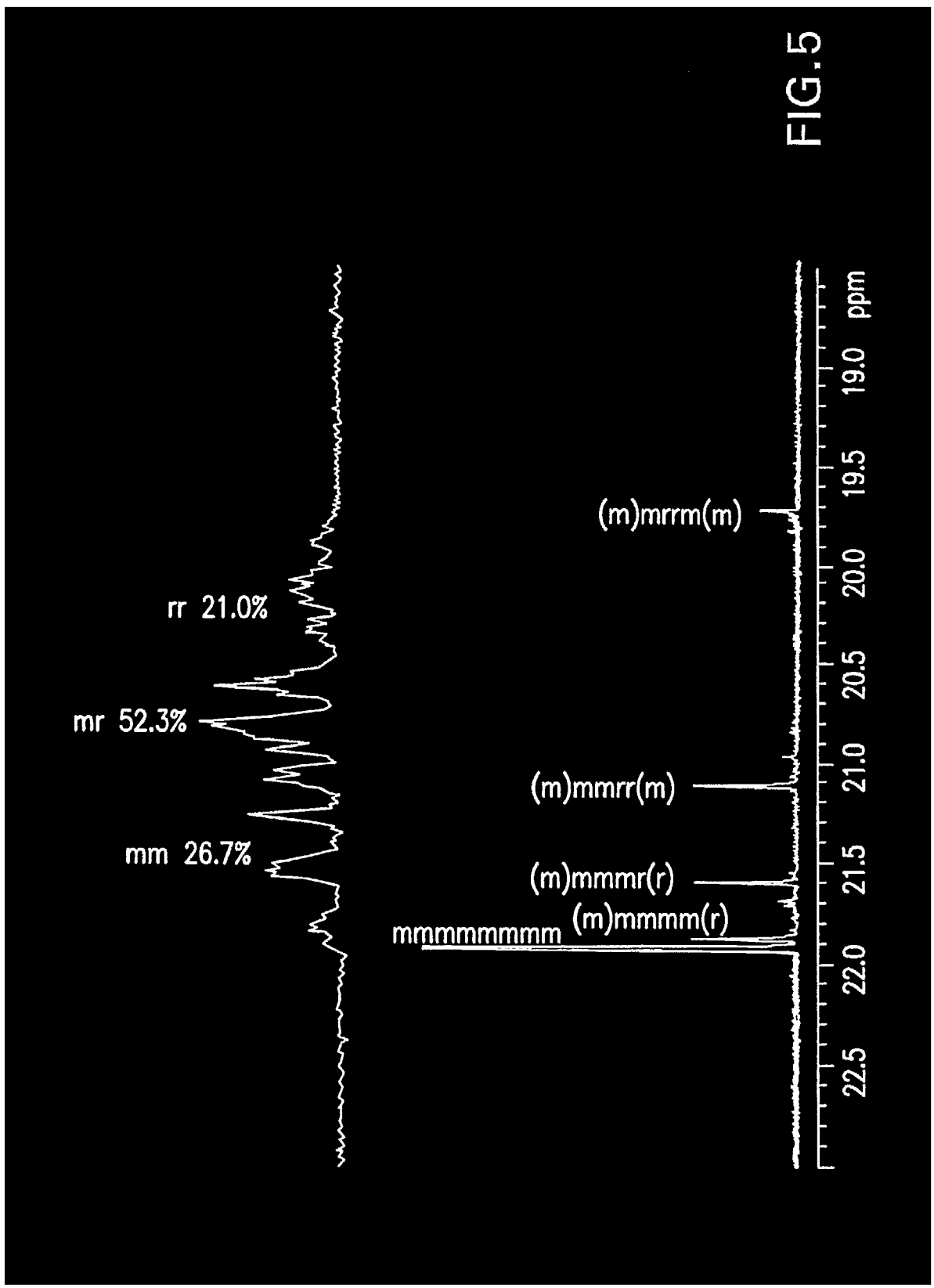
FIG. 5 is the $^{13}C$ NMR spectra of the polymerization of propylene under degenerative transfer conditions.

More specifically, as shown in FIG. 5, $^{13}C\{^1H\}$ NMR (125 MHz, 1,1,2,2-$C_2D_4Cl_2$, 70° C.) pentad analysis of the methyl region confirmed that poly(propylene) prepared under DT conditions is strictly atactic (top spectrum), while poly(propylene) prepared under non-DT conditions is highly isotactic (bottom spectrum) with stereocontrol occurring under exclusive enantiomorphic site control ([mmmm]=0.76, [mrrm]=0.37, $\alpha$=0.95). Indeed, the high degree of isoselectivity for propene enchainment initiated by 3 is among the best recorded for living propylene polymerization (Busico, V., et al., *Macromolecules* 37:8201-8203 (2004); Mason, A. F. and Coates, G. W., *J. Am. Chem. Soc.* 126:16326-27 (2004)).

As shown in FIG. 5, $^{13}C$ NMR spectra establish that propagation occurs through 1,2-insertion of propylene with less than 0.5% of 2,1-insertion regioerrors being observed, and $^1H$ NMR spectra revealed the absence of any vinyl resonances that could be attributed to termination by β-hydrogen transfer processes.

Figure 6:
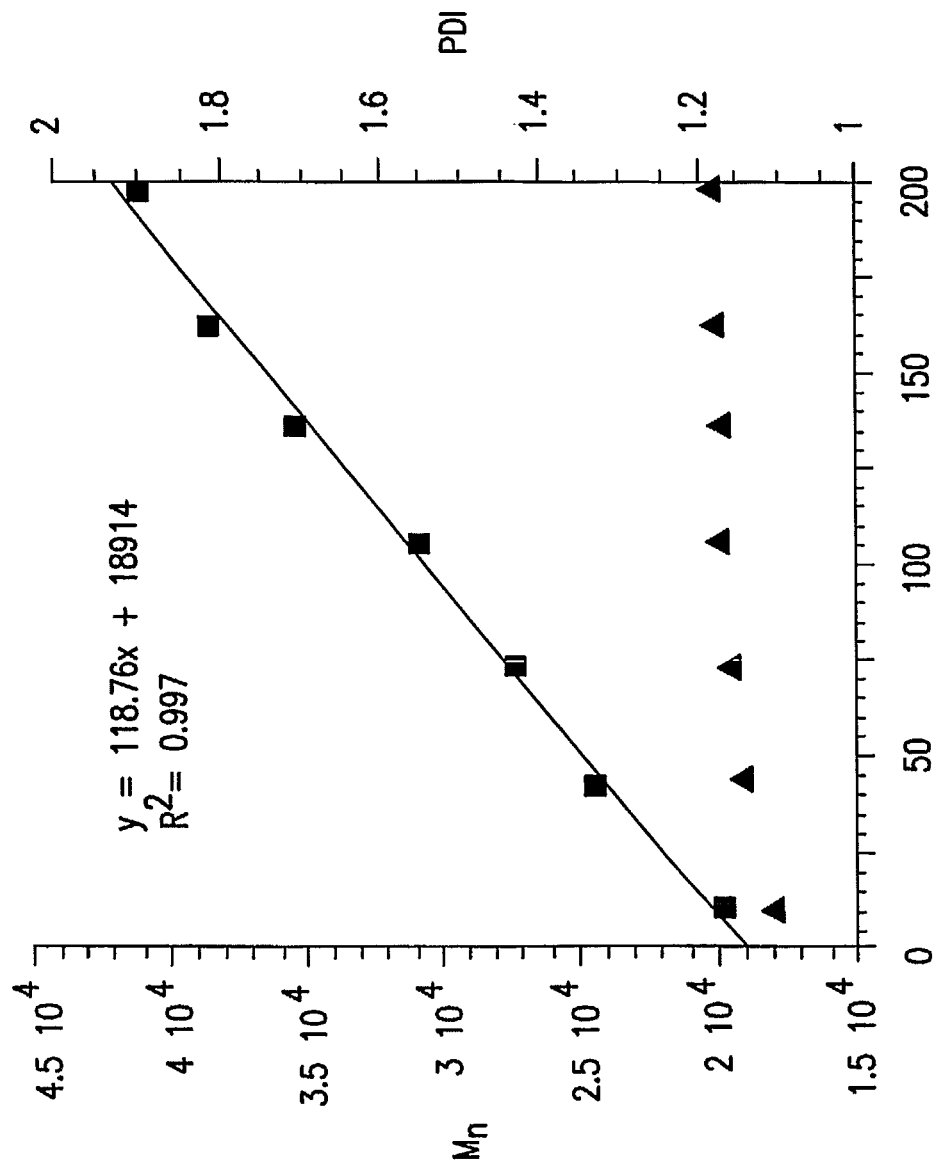
FIG. 6 is a graphic analysis of the kinetics of the polymerization of propylene under degenerative transfer and non-degenerative transfer conditions.

As shown in FIG. 6, confirmation that propylene polymerizations under both DT and non-DT conditions occur in a living fashion was provided by kinetic analyses. FIG. 6 shows that the number average molecular weight index, $M_n$, of the polymer increases in a strictly linear fashion, while D values remain constant at <1.18, as a function of time as a result of the number of propagating centers remaining constant; a true signature of a living system (Szwarc M. and van Beylen, M. *Ionic Polymerization and Living Polymers*, Chapman & Hall: New York, 1993).

The isotactic-atactic-isotactic stereoblock triblock poly (propylene), with relative block contents of 10:80:10, was synthesized in programmed fashion (exp. $M_n$=105 000, D=1.16). Upon compression molding at 110° C., preliminary tensile testing of a cut dumbbell sample (ASTM standard D412) yielded an ultimate elongation to break of 1260% and a residual elongation of <5% after a 200% strain.

Because the propylene polymerizations of the present invention are living, the type of stereoblock can be switched as many times as desired from being initially atactic (ratio of 1:2 is about 0.5) by simply interrupting the propylene feed, adding either 0.5 equiv of 1 (which switches the polymerization from atactic to isotactic) or 0.5 equiv of 4 (which switches the polymerization from isotactic to atactic), and then resuming polymerization with the reintroduction of propylene.

The uniform isotactic-atactic stereoblock microstructure provided by the isotactic-atactic-isotactic triblock poly(propylene) correlated with microphase-separation between crystalline and amorphous domains such as that known to occur in fully hydrogenated SBS triblock materials (Adams, J. L., et al., *Macromolecules* 31:201-204 (1998)).

Figure 7A:
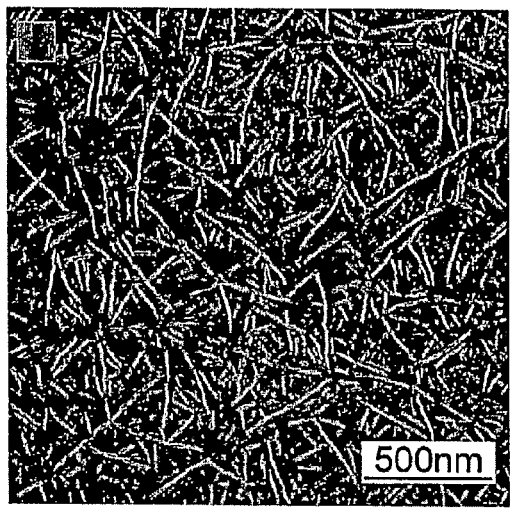
FIGS. 7A and 7B are Atomic Force Microscopy (AFM) images of a triblock poly(propylene) prepared in accordance with the present invention.
Figure 7B:
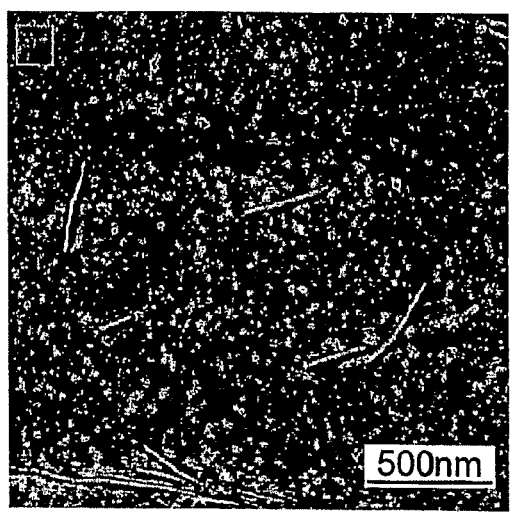

As shown in FIG. 7A, characterization by ps-tm AFM of annealed (130° C.) thin films of 7 supported on an amorphous carbon (a-C) substrate revealed that microphase-separation of this material on the nanometer length scale occurs. As shown in FIG. 7B, after deposition of this material from very dilute solution (0.1 w/w %), followed by annealing at 130° C., individual nanostructures of 7 could be imaged. In this phase image, the rod-shaped nanostructures can be viewed as consisting of a hard central crystalline nanoribbon/nanofiber that is flanked by soft amorphous material which gives rise to the dark corona that is observed. Such a corona is absent in ps-tm AFM images of crystalline nanostructures obtained from monodisperse isotactic poly(propylene).

In another embodiment, the present invention relates to a method of producing a stereogradient poly(olefin) comprising contacting a Ziegler-Natta pre-catalyst with an olefin and a co-catalyst, wherein the amount of the co-catalyst activates a percentage of the Ziegler-Natta pre-catalyst; polymerizing the olefin to form a living poly(olefin) having a first stereodefined microstructure, increasing the percentage of activated Ziegler-Natta pre-catalyst by adding co-catalyst over time or decreasing the percentage of activated Ziegler-Natta pre-catalyst by adding a methyl donator over a period of time; and further polymerizing said olefin during said period of time to form a living poly(olefin) having a stereogradient microstructure.

The initial percentage of activated Ziegler-Natta pre-catalyst can vary, depending on the desired tacticity of the initial stereoblock. For example, the Ziegler-Natta pre-catalyst is initially 100 percent activated, in the range of about 98 to about 5 percent activated, 98, 95, 92, 90, 85, 80, 75, 70, 65, 60, 55, 50, 45, 40, 35, 30, 25, 20, 15, 10 or 5 percent activated. When the Ziegler-Natta pre-catalyst is initially 100% activated the first stereodefined microstructure is isotactic.

In one example, additional co-catalyst or methyl donator can be added over a period of time that can range from about 1 minute to about 6000 minutes. In an alternative example, the period of time is less than about 8 hours. In another example, the period of time is about 120 minutes. During addition, the stereoregularity of the polymerization gradually changes to become more isotactic when co-catalyst is added, or more atactic when methyl donator is added. The stereogradient profile can be predetermined based on the period of time over which the co-catalyst or methyl donator are added. For example, stereogradient profiles can be sharp and immediate (less than about 5 chiral centers) when the co-catalyst or methyl donator is directly added all at once. In another example, adding the co-catalyst or methyl donator over a short period of time, will give a steep profile, in which the microstructure of the poly(olefin) quickly changes from one stereotype to another. Or, in another example, the profile can be very gradual (over more than about 25 chiral centers), in that the co-catalyst or methyl donator is added over longer periods of time.

The step of adding co-catalyst or methyl donator to change the percent of activated Ziegler-Natta pre-catalyst can be repeated any number of times. For example, it can be repeated 1 time to produce a triblock stereogradient poly(olefin). In another example, it can be repeated more than 1 time, i.e., 2, 3, 4, 5, 6, 7, 8, 9 or 10 times. When the step of adding co-catalyst or methyl donator is repeated, the time period over which it is added may be different than the initial time period. This variation allows for the production of multiblock stereogradient poly(olefin)s having different stereogradient profiles. For example, poly(olefin)s can be produced that have stereoblocks with sharp or immediate transitions between stereoblocks, followed by stereoblocks with gradual transitions.

Figure 8A:
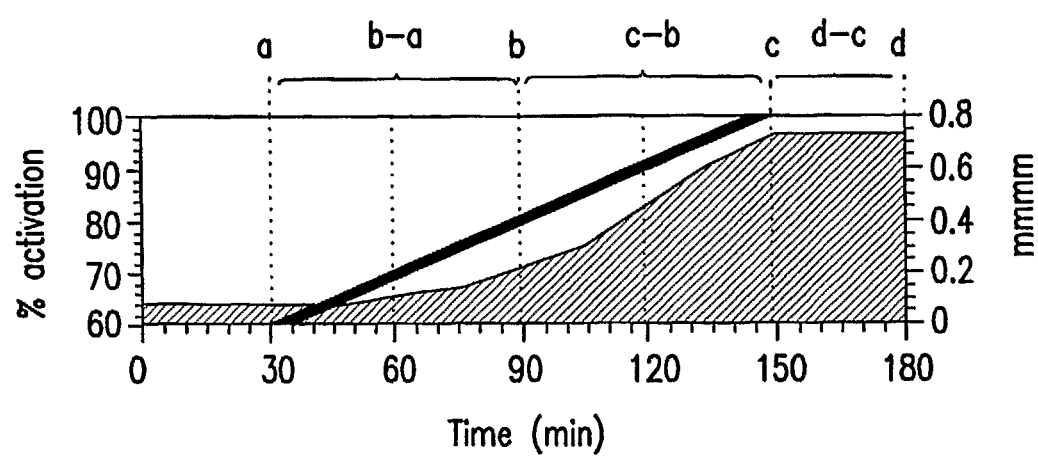
FIGS. 8A-8C show a polymerization profile and NMR analysis of the resulting stereogradient poly(propylene) prepared in accordance with an embodiment of the present invention.

FIG. 8A, illustrates the potential of an embodiment of the methods for producing stereogradient poly(olefin)s. More specifically, the ramp profile for addition of co-catalyst 2 is shown by the black line. After an initial 30 minute period of atactic poly(propylene) chain growth at 60% activation, a programmable syringe pump was used to steadily increase the level of activation to a final 100% by introducing an additional 0.4 equivalents of 2 as a function of time (represented by the shading in FIG. 8A). In order to establish both the stereogradient nature and the stereochemical homogeneity of the final material, precatalyst 1, synthesized with $^{13}$C (99%) labeled methyl groups (Y. Zhang, R. J. Keaton, L. R. Sita, *J. Am. Chem. Soc.* 125:9062 (2003)), was used to place a $^{13}$C-labeled methyl end group at the beginning of polymer chain growth. Aliquots were taken as a function of time.

Figures 8B, 8C:
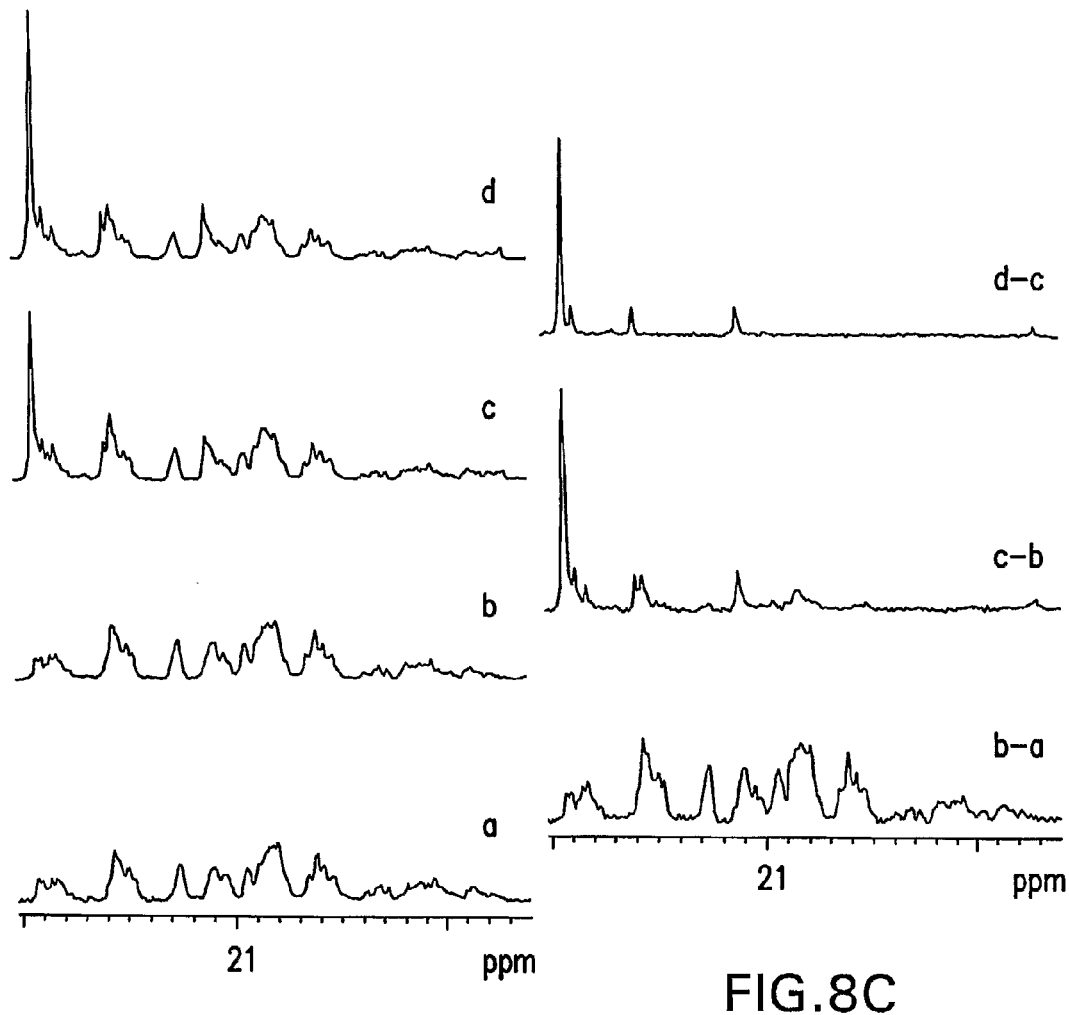

FIG. 8B shows $^{13}$C{$^1$H} NMR (125 MHz, 1,1,2,2,-C$_2$D$_4$Cl$_2$, 70° C.) spectra obtained as a function of time for the methyl region of the isolated poly(propylene) material aliquots. The letters in FIG. 8B correspond to the letters in FIG. 8A, which show the time at which the aliquot was taken. By using the $^{13}$C-labeled methyl end group resonances appearing between 22.5-23.0 ppm (not shown in FIG. 8B) as an internal reference, difference $^{13}$C NMR spectra were produced as shown in FIG. 8C. The letters in FIG. 8C correspond to the letters in FIG. 8A, and represent the time periods over which the co-catalyst was added. The difference spectra confirmed that chain growth steadily changes from being completely atactic to being highly isotactic as a function of time.

Importantly, with additional aliquots and difference spectra, it was possible to demonstrate that the % mmmm content of the material closely tracks the ramp profile for addition of 2 (see shading in FIG. 8A). Thus, by programming different ramp profiles, together with reversing the direction of the ramp through addition of a methyl donor that can be used to selectively methylate cationic propagating centers so as to increase the concentration of dormant states (i.e., to 'lower' the level of activation) (M. B. Harney, Y. Zhang, L. R. Sita, *Angew. Chem., Int. Ed.* 45 (2006), in press), an infinite variety of new stereogradient poly(propylene) materials can be envisioned and prepared.

In another embodiment, the present invention relates to a method of introducing mr triad stereoerrors in a poly(olefin) polymerization, comprising contacting a first living poly(olefin) center with a methyl donor to render the first living poly(olefin) center configurationally unstable, contacting the configurationally unstable first living poly(olefin) center with a second living poly(olefin) center or co-catalyst to render the first living poly(olefin) center configurationally stable; and contacting said configurationally stable first living poly(olefin) center with olefin to form a poly(olefin) having said mr stereoerror triad.

The following examples are illustrative, but not limiting, of the method and compositions of the present invention. Other suitable modifications and adaptations of the variety of conditions and parameters normally encountered in poly(olefin) synthesis and which are obvious to those of ordinary skill in the art are within the spirit and scope of the invention.

EXAMPLES

Manipulations were performed under an inert atmosphere of dinitrogen using standard Schlenk techniques or a glovebox (Vacuum Atmospheres Co., Hawthorne, Calif.). Dry, oxygen-free solvents were employed throughout. Polymerization solvent chlorobenzene was distilled from calcium hydride. Research grade propylene (99.97%) was purchased from Matheson Tri-Gas (Montgomeryville, Pa.), and passed through Q5 copper catalyst (a commercially available oxygen scrubber) and molecular sieves (4 Å). ($\eta^5$-C$_5$Me$_5$)ZrMe$_2$[N(Et)C(Me)N($^t$Bu)] 1, ($\eta^5$-C$_5$Me$_5$)ZrMe$_2$[N(Et)C(Bu)N($^t$Bu)] 4 were prepared as previously reported. [PbNHMe$_2$][B(C$_6$F$_5$)$_4$] was purchased from Strem Chemicals, Inc. (Newburyport, Mass.) or Boulder Scientific (Mead, Colo.) and used without further purification. GPC analyses were performed using a Viscoteck GPC system equipped with a column oven and differential refractometer both maintained at either 35° C. or 45° C. and four columns also maintained at 35° C. or 45° C. Tetrahydrofuran (THF) was used as the eluant at a flow rate of 1.0 mL/min. $M_n$ and $M_w/M_n$ values were obtained using the Viscoteck GPC software or the OmniSEC software and seven different polystyrene standards (Polymer Laboratories, Amherst, Mass.). $^{13}$C {$^1$H}NMR spectra were recorded at 125 MHz, using 1,2-dichloroethane-d$_2$ or 1,1,2,2-tetrachloroethane-d$_2$ as the solvent at 70° C.

Example 1

Polymerization of Propylene Under DT Conditions

1$^{st}$ Example

General procedure: To a solution of about 10.0 mg (0.013 mmol) 2 in about 0.5 ml of chlorobenzene at about −10° C. was added about 10.0 mg (0.025 mmol) of 1 in about 0.5 ml of chlorobenzene at about −10° C. This solution was then rapidly added to a 50 ml Schlenk flask charged with about 20 ml of chlorobenzene at about −10° C., which was previously pressurized to about 5 psi with propylene and stirred for about 10 minutes. The flask was then repressurized and the pressure maintained for about 2 hours while stirring before quenching with about 1 ml of acidic methanol. The volatiles were then removed in vacuo and the crude polymeric material was purified through precipitation of a hot toluene solution into a large volume of acidic methanol. The final pure polypropylene was collected and dried overnight at about 60° C. (0.01 mmHg).

Kinetics experiment under DT conditions: The polymerization was carried out in the same manner as the general procedure, while about 20.0 mg (0.05 mmol) of 1 and about 20.0 mg (0.025 mmol) of 2 were used and the total solution volume was about 35 ml. Aliquots were quenched with methanol after about 48 min and 5 more points were collected within the next 5 h. Polypropylene samples were purified and GPC data was collected. FIG. 4 shows the kinetic analysis of the aliquots.

Example 2

Polymerization of Propylene Under DT Conditions

2nd Example

To a solution of 24.2 mg (0.030 mmol) 2 in 0.5 ml of chlorobenzene at −10° C. was added 20.0 mg (0.050 mmol) of 1 in 0.5 ml of chlorobenzene at −10° C. This solution was then rapidly added to a 250 ml Schlenk flask charged with 20 ml of chlorobenzene at −10 C, which was previously pressurized to 5 psi with propylene and stirred for 10 minutes. The flask was then repressurized and the pressure maintained for 2 hours while stirring before quenching with 1 ml of acidic methanol. The volatiles were then removed in vacuo and the crude polymeric material was purified through precipitation of a hot toluene solution into a large volume of acidic methanol. The final pure polypropylene was collected and dried overnight at 60° C. (0.01 mmHg). 735 mg. $M_n$=25,200, PDI=1.41.

Using similar conditions as above, the following examples show the results for differing levels of activation of the pre-catalyst by the co-catalyst.

50% activation: 20.1 mg (0.025 mmol) 2, 2 h 50 min, yield: 926 mg. $M_n$=25,500, PDI=1.11.

70% activation: 28.2 mg (0.035 mmol) 2, yield: 0.692 g. $M_n$=21,700, PDI=1.18.

80% activation: 32.2 mg (0.040 mmol) 2, yield: 0.681 g. $M_n$=27,400, PDI=1.20.

85% activation: 34.2 mg (0.0425 mmol) 2, yield: 0.812 g. $M_n$=25,000, PDI=1.22.

90% activation: 36.3 mg (0.045 mmol) 2, yield: 0.753 g. $M_n$=24,400, PDI=1.22.

92.5% activation: 40.0 mg (0.100 mmol) 1, 74.5 mg (0.0925 mmol) 2, 40 ml chlorobenzene, yield: 1.666 g. $M_n$=22, 400, PDI=1.24.

95% activation: 38.3 mg (0.0475 mmol) 2, yield: 0.756 g. $M_n$=23,000, PDI=1.22.

100% activation (non-DT): 10.0 mg (0.025 mmol) 1, 20.1 mg (0.025 mmol) 2, yield: 0.500 g.

TABLE 1

Pentad distributions of PP from DT systems.

| % activation | mmmm | mmmr | rmmr | mmrr | mmrm + rmrr | rmrm |
|---|---|---|---|---|---|---|
| 100 | 0.713 | 0.101 | 0.009 | 0.103 | 0.021 | 0.003 |
| 95 | 0.602 | 0.142 | 0.005 | 0.095 | 0.087 | 0.007 |
| 92.5 | 0.422 | 0.202 | 0.022 | 0.092 | 0.179 | 0.031 |
| 90 | 0.302 | 0.210 | 0.037 | 0.092 | 0.221 | 0.059 |
| 85 | 0.190 | 0.201 | 0.050 | 0.098 | 0.254 | 0.094 |
| 80 | 0.162 | 0.194 | 0.055 | 0.099 | 0.267 | 0.110 |
| 70 | 0.105 | 0.166 | 0.061 | 0.102 | 0.269 | 0.135 |
| 60 | 0.067 | 0.144 | 0.069 | 0.106 | 0.274 | 0.146 |
| 50 | 0.052 | 0.126 | 0.070 | 0.103 | 0.274 | 0.159 |

| % activation | rrrr | rrrm | mrrm |
|---|---|---|---|
| 100 | 0.005 | 0.003 | 0.044 |
| 95 | 0.002 | 0.012 | 0.047 |
| 92.5 | 0.004 | 0.018 | 0.035 |
| 90 | 0.008 | 0.031 | 0.040 |
| 85 | 0.016 | 0.050 | 0.047 |
| 80 | 0.016 | 0.055 | 0.043 |
| 70 | 0.032 | 0.079 | 0.051 |
| 60 | 0.044 | 0.098 | 0.051 |
| 50 | 0.052 | 0.103 | 0.061 |

Figure 9:
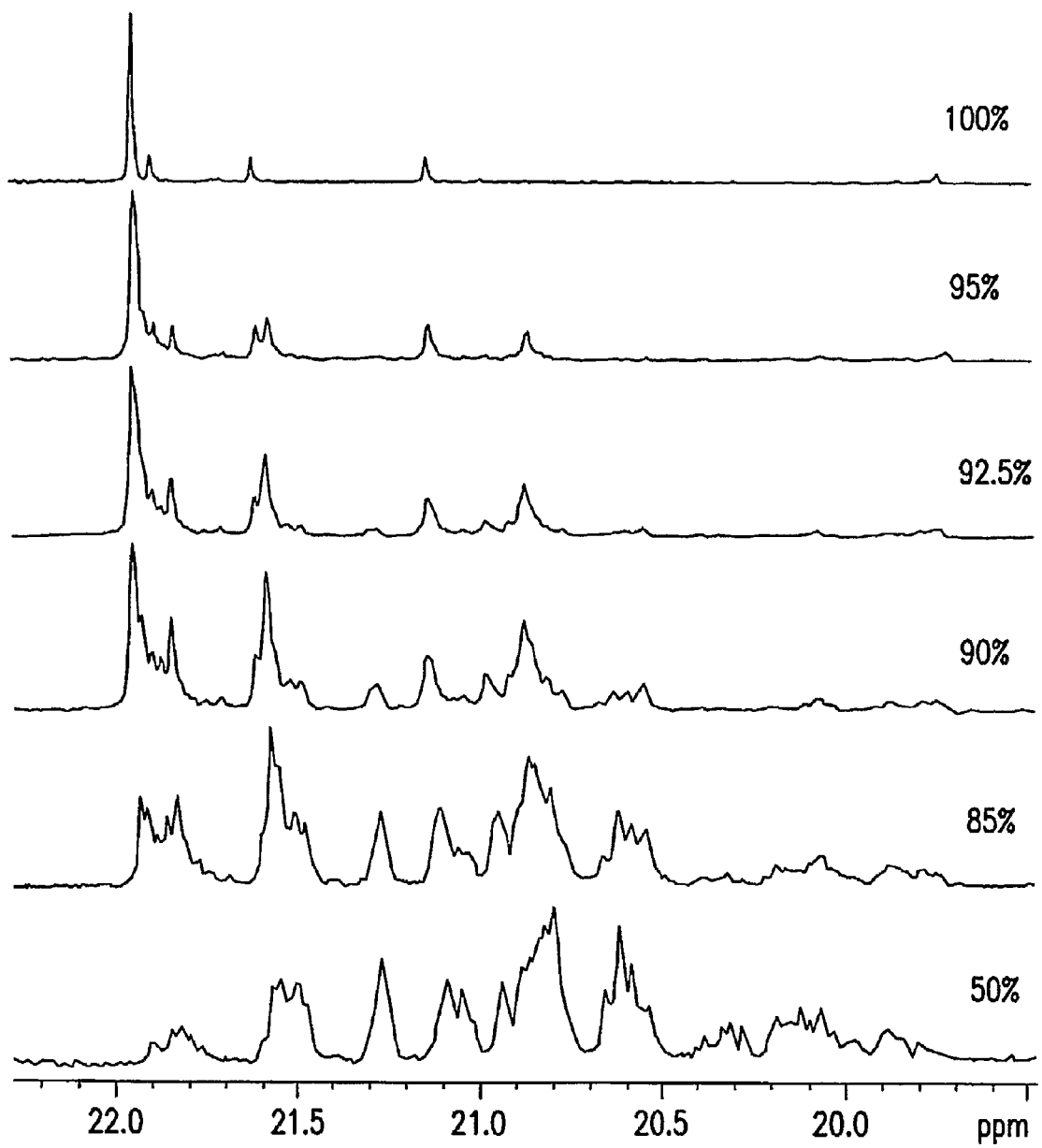
FIG. 9 shows NMR spectra for poly(propylene) prepared with different levels of Ziegler-Natta pre-catalyst activation.

FIG. 9 shows a series of $^{13}C\{^{1}H\}$ NMR (125 MHz, 1,1,2,2-$C_2D_4Cl_2$, 70° C.) spectra for the methyl region of the poly (propylene) materials in which the highly isotactic microstructure obtained at 100% activation is transformed to a fully atactic one by simply decreasing the level of activation. Note that the spectra are shown with increasing arbitrary y-scaling (top to bottom) for sake of clarity (polymerization conditions: 5 p.s.i. propylene, chlorobenzene, −10° C., $[1]_0$=mM).

Figure 10:
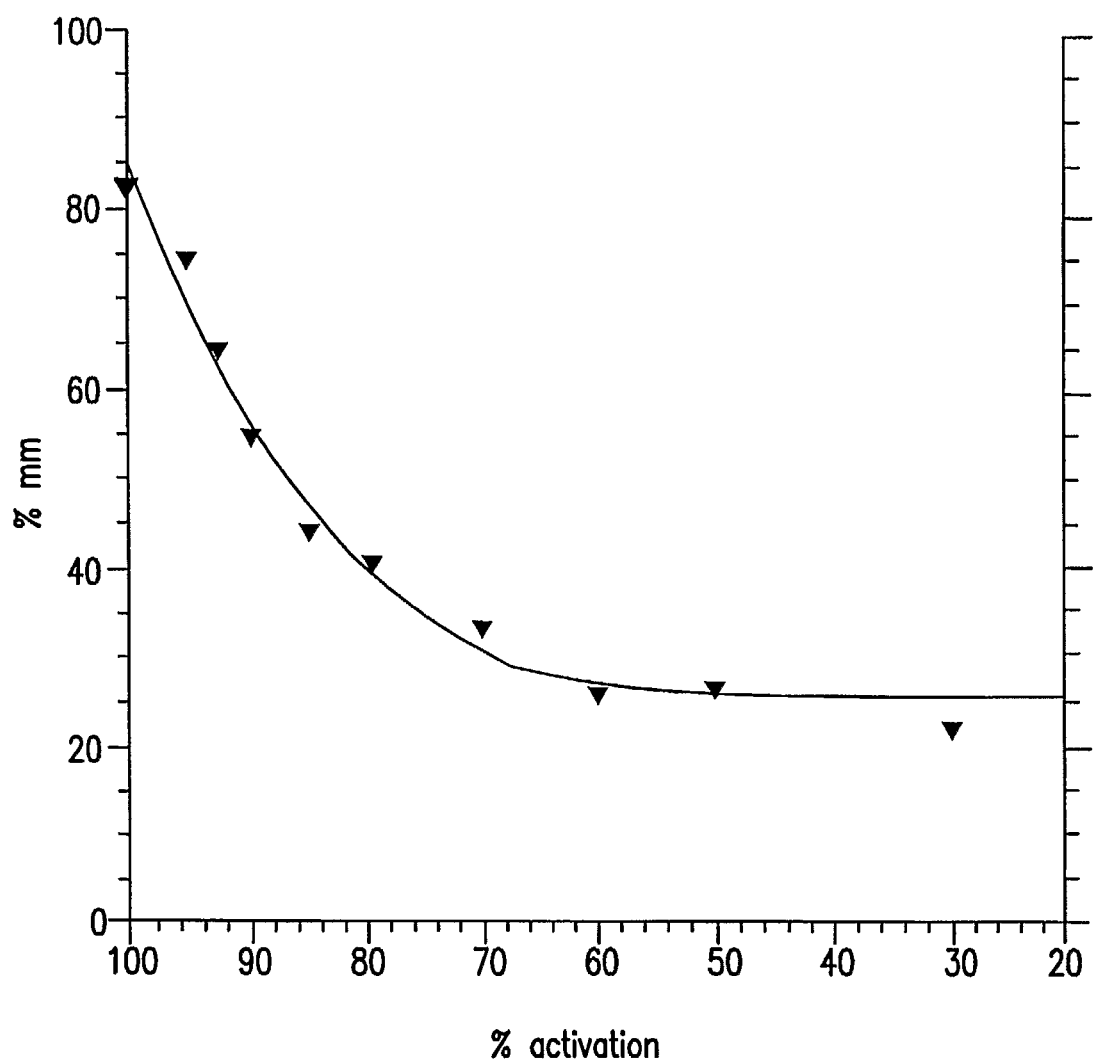
FIG. 10 is a graphic depiction of how mm triad % changes in poly(propylene) prepared using various levels of % activation.

FIG. 10 shows the % mm stereochemical triad content as a function of % activation for $^{13}C$ NMR stereoerror analysis. This better illustrates the rate and nonlinear fashion in which a polymerization is transformed from an isotactic to atactic by controlling DT poly(propylene) polymerization. Polymerization conditions were similar to those described above.

Figure 11:
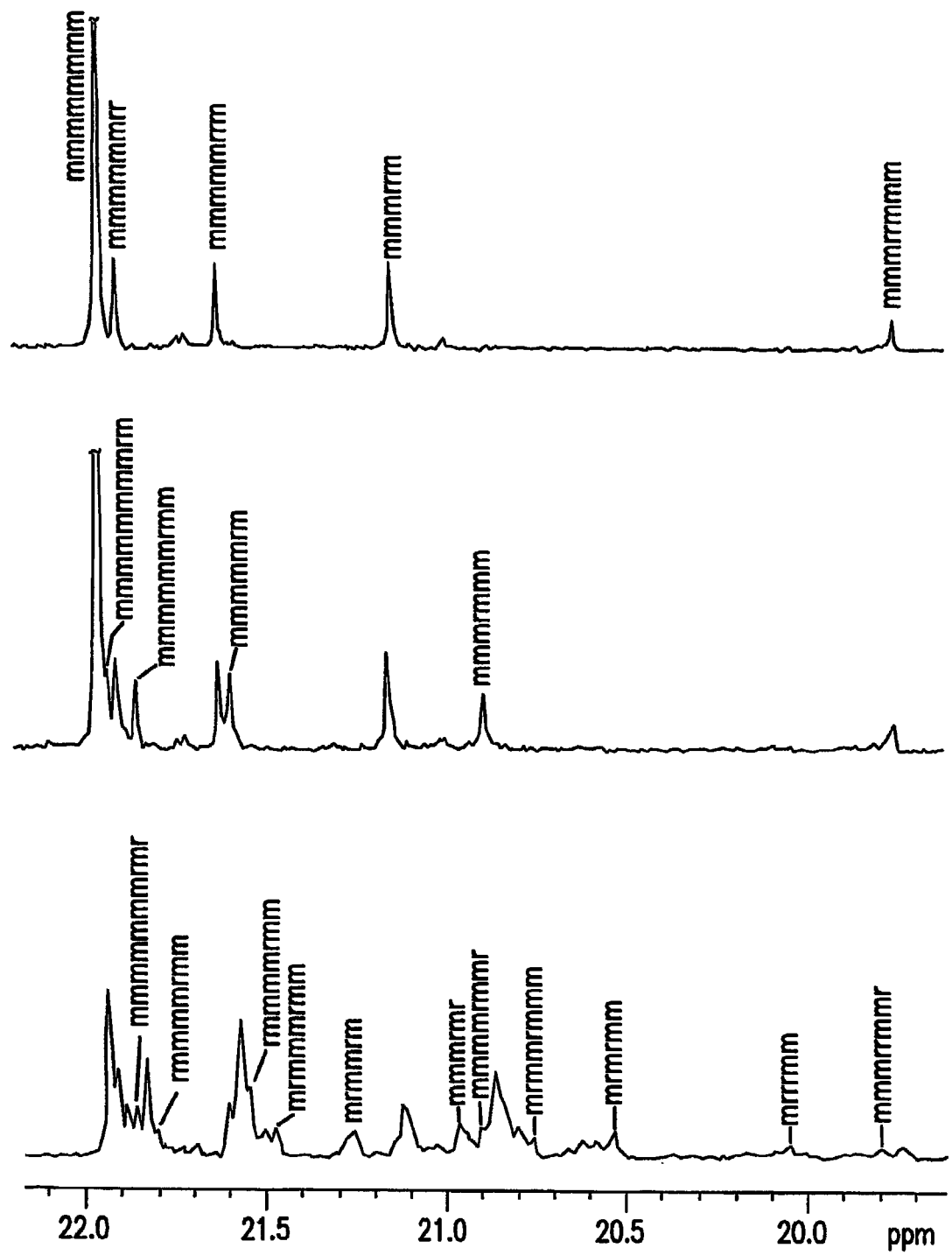
FIG. 11 shows microstructure analysis for poly(propylene) NMR spectra.

FIG. 11 shows a preliminary stereochemical analysis of the NMR spectra of FIG. 9 at the heptad and nonad level. The partial stereoerror assignments are consistent with the expected decrease in isotactic sequence length with a decrease in % activation due to an increasing incorporation of isolated mr triad stereoerrors. The top spectrum is for 100% activation, the middle spectrum is for 95% activation and the bottom spectrum is for 90% activation. The stereoerror incorporations is due to a switch in the 'handedness' of isotactic propagation as the result of epimerization of the propagating center according to Scheme 4. Note that at 100%, the nature of the stereoerrors are consistent with exclusive enantiomorphic site control of propagation.

Example 3

Polymerization of Propylene Under Non-DT Conditions

General procedure The polymerization was carried out in the same manner as DT conditions (Example 2), except for about an equal molar ratio of ($\eta^5$-$C_5Me_5$)$ZrMe_2$[N(Et)C(Me)N($^t$Bu)] to [PhNHMe$_2$][B($C_6F_5$)$_4$] was used.

Kinetics under non-DT condition: In order to circumvent solubility issues, the kinetics of isotactic propagation were determined by first synthesizing an atactic polypropylene block under DT conditions using about 20.5 mg (0.051 mmol) 1 and about 21.2 mg (0.026 mmol) 2 in about 10 ml chlorobenzene for about 2 hours. The solution was then diluted to about 60 ml total volume and the reaction was switched to non-DT conditions by fully activating the system with a second portion of about 21.2 mg of 2. Aliquots were quenched with acidic methanol at about 10 min. from full activation and approximately every 30 min. thereafter for 3 h. FIG. 5 shows $^{13}C$ NMR spectra of the atactic-isotactic polypropylene samples. FIG. 6 shows the kinetic analysis of the polymerization under non-DT conditions.

Example 4

Synthesis of an iso-poly(1-octene)-a-poly(1-hexene)-iso-poly(1-octene)-a-poly(1-hexene)-iso-poly(1-octene) pentablock Note: after the polymerization for each step, an aliquot was taken out for GPC and NMR analysis. The aliquot volume was taken into consideration to make sure that for each block, about 50 equivalents of monomer was added. a). At about −10° C., to a solution of [PhNHMe$_2$][B($C_6F_5$)$_4$] 2 (40.1 mg, 50 µmol) in about 10 ml of chlorobenzene, was added a solution of Cp*ZrMe$_2$[N(Et)C(Me)N($^t$Bu)] 1 (19.9 mg, 50 µmol) in about 5 ml of chlorobenzene. 1-Octene (281 mg, 2.5 mmol) was added all at once at about −10° C. An aliquot (about 1.5 ml) was quenched with MeOH in 2 h. b). Cp*ZrMe$_2$[N(Et)C(tBu)N($^t$Bu)] 4 (11.0 mg, 2.25 µmol) was added to the solution, followed by 189 mg of 1-hexene (2.25 mmol). In an additional 3 h, 1.5 ml of aliquot was quenched with MeOH. c). 2 (16.1 mg, 20 µmol) was added to the solution, followed by 224 mg of 1-octene (2.0 mmol). 1.5 ml of aliquot was then quenched with MeOH in 3 h. d). 4 (7.7 mg, 1.75 µmol) was added to the solution, followed by 147 mg of 1-hexene (1.75 mmol). In an additional 3 h, 1.5 ml of aliquot was again quenched with MeOH. e). 2 (12.0 mg, 15 µmol) was added to the solution, followed by 168 mg of 1-octene (1.5 mmol). The polymerization was then quenched with MeOH in an additional 3 h. All the polymer samples obtained from the aliquots and the bulk material were purified by precipitation of a toluene solution of the polymer to a large quality of acidic methanol. Table 1 shows the molecular weight analysis ($M_n$) of each aliquot and the corresponding polydispersity index. FIG. 2 shows the corresponding GPC chromatograms of each aliquot. FIG. 3 shows the corresponding $^{13}C$ NMR spectra for each aliquot.

TABLE 1

$M_n$ and PDI of each polymer sample.

| Block | $M_n$ | PDI |
|---|---|---|
| 1 (iso-PO) | 7 800 | 1.06 |
| 2 (iso-PO-a-PH) | 12 000 | 1.07 |
| 3 (iso-PO-a-PH-iso-PO) | 18 300 | 1.07 |
| 4 (iso-PO-a-PH-iso-PO-a-PH) | 23 400 | 1.08 |
| 5 (iso-PO-a-PH-iso-PO-a-PH-iso-PO) | 28 500 | 1.08 |

Example 5

Synthesis of iso-a-iso-polypropylene) Stereoblock Triblock (7)

Figure 12:
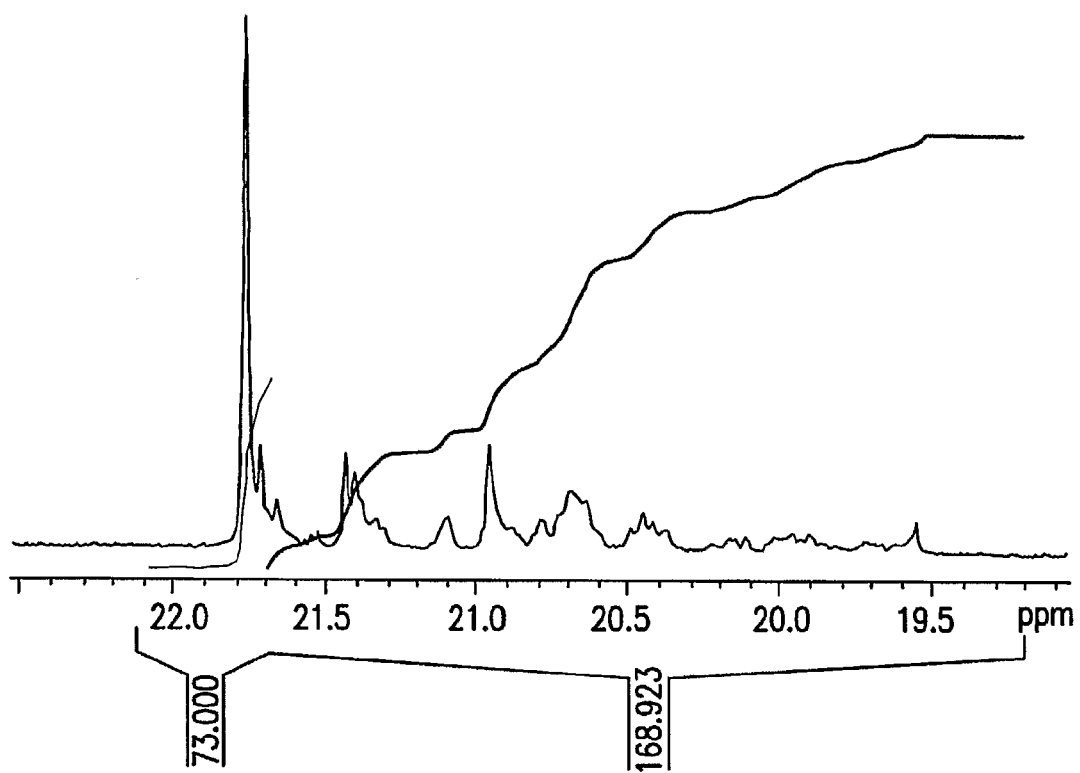
FIG. 12 is the $^{13}C\{^1H\}$ NMR spectrum of a triblock poly (propylene) prepared in accordance with the present invention.

Polymerization: Under non-DT conditions, a polymerization was carried out using about 24.7 mg (0.062 mmol) 1 and about 51.6 mg (0.064 mmol) 2 in about 100 ml chlorobenzene for about 4 h. At this point the reaction was switched to DT by an addition of about 13.6 mg (0.031 mmol) of 4 in about 0.5 ml chlorobenzene for about 24 h. The reaction was returned to non-DT by the addition of a second portion of about 25.0 mg (0.031) 2 for about 4 h. The reaction was then quenched with about 1 mL of acidic methanol, the volatiles were removed in vacuo and the crude polymeric material was purified through precipitation of a hot toluene solution into a large volume of acidic methanol. The final pure polypropylene was collected and dried overnight at about 60° C. (0.01 mmHg). Yield: 3.5 g. $M_n$=124,400, PDI=1.24. Detailed $^{13}C\{^1H\}$ NMR pentad analysis proved the iso: a ratio of the triblock is about 41:59. FIG. 12 shows the $^{13}C\{^1H\}$ NMR (125 MHz, 1,2-dichloroethane, 70° C.) of the poly(propylene) triblock 7.

Figure 13:
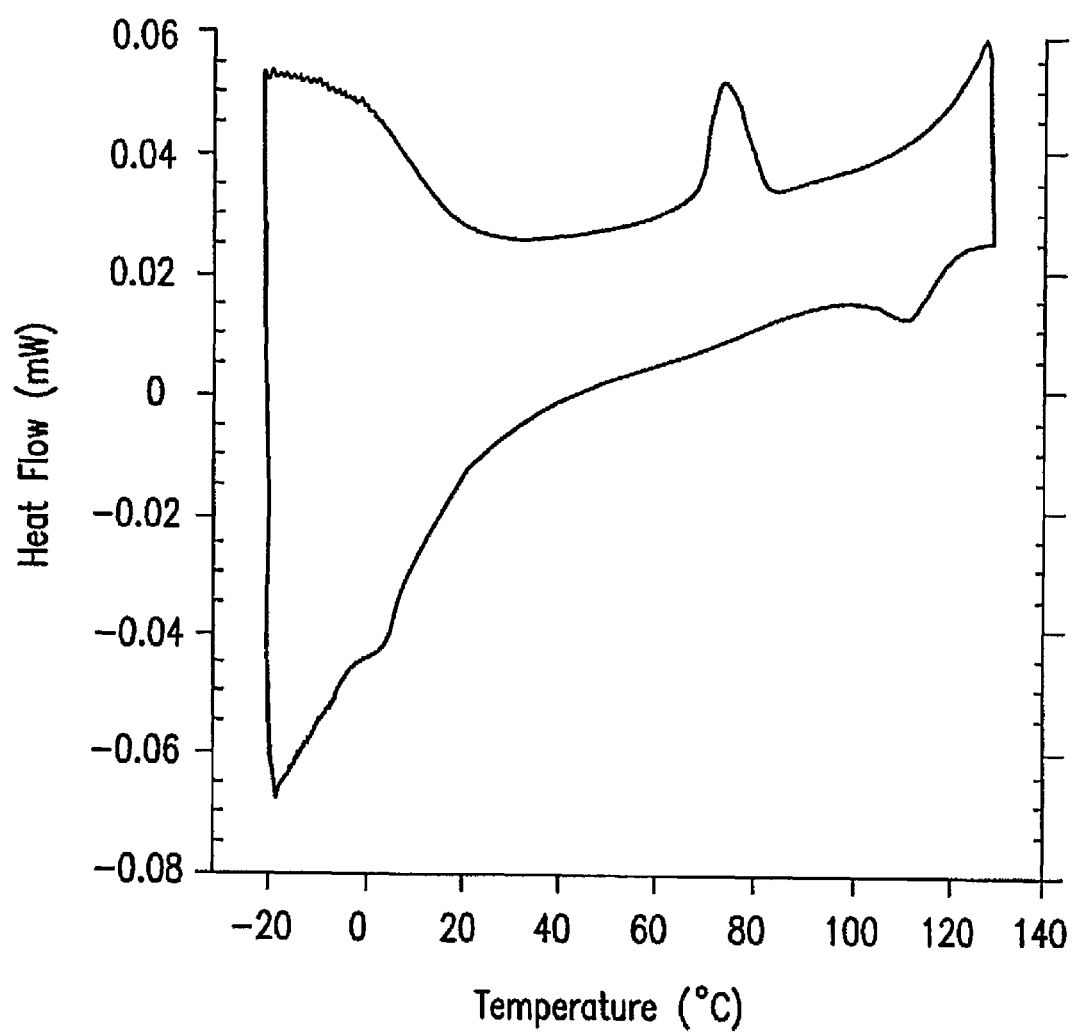
FIG. 13 is a Differential Scanning Calorimetry (DSC) trace of a triblock poly(propylene) prepared in accordance with the present invention.

Thermal analysis: DSC was used to analyze the polypropylene) triblock 7. FIG. 13 shows the DSC trace, which exhibits a single sharp melting point around 118° C. and a single sharp crystallization point at about 78° C.

Tensile test: The tensile test was carried out based on ASTM D 412-98a. Film thickness is 0.5 mm. The tension test speed is 0.5 in/min.

Ultimate elongation: 1150%.
Recovery after rupture: 94.7%
Recovery after 300% elongation: 95.6%

Example 6

Synthesis of $^{13}$C-labeled Stereogradient Polypropylene

To a solution of 48.1 mg (0.060 mmol) 2 in 0.5 ml of chlorobenzene at −10° C. was added 40.1 mg (0.100 mmol) of 1-$^{13}C_3$ in 0.5 ml of chlorobenzene at −10° C. (60% activation). This solution was then rapidly added to a 250 ml Schlenk flask charged with 40 ml of chlorobenzene at −10° C., which was previously pressurized to 5 psi with propylene and stirred for 10 minutes. The flask was then repressurized and the pressure maintained for 30 minutes while stirring. A 0.5-ml aliquot was quenched, and 4.0 ml of a 10.0 mM solution of 2 in 1:1 chlorobenzene:dichloromethane was added via syringe pump at a constant rate of 2 ml/h, during which time 0.5-ml aliquots were taken every 30 minutes. Upon complete addition, another 0.2 ml of solution of 2 was added to ensure complete activation, and the reaction maintained for another 30 minutes before quenching with 1 ml of acidic methanol. The volatiles were then removed in vacuo and the crude polymeric material was purified through precipitation of a hot toluene solution into a large volume of acidic methanol. The final pure polypropylene was collected and dried overnight at 60° C. (0.01 mmHg). Yield: 1.803 g. Aliquot at 30 min: $M_n$=7,500, PDI=1.19. At 60 min: $M_n$=12,400, PDI=1.19. At 90 min: $M_n$=16,600, PDI=1.20. At 120 min: $M_n$=20.800, PDI=1.19. At 150 min: $M_n$=22,900, PDI=1.23. Final quench at 180 min: $M_n$=25,200, PDI=1.22.

TABLE 2

Pentad distribution of stereogradient-PP aliquots.

| Time(min) | Activation* | mmmm | mmmr | rmmr | mmrr | mmrm + rmrr |
|---|---|---|---|---|---|---|
| 30 | 60% | 0.085 | 0.142 | 0.059 | 0.105 | 0.265 |
| 60 | 70% | 0.076 | 0.144 | 0.061 | 0.105 | 0.269 |
| 90 | 80% | 0.099 | 0.160 | 0.062 | 0.105 | 0.270 |
| 120 | 90% | 0.132 | 0.168 | 0.055 | 0.099 | 0.266 |
| 150 | 100% | 0.230 | 0.161 | 0.046 | 0.099 | 0.225 |
| 180 | 100% | 0.296 | 0.152 | 0.041 | 0.099 | 0.196 |

| Time(min) | Activation* | mrrm | rrrr | rrrm | mrrm |
|---|---|---|---|---|---|
| 30 | 60% | 0.143 | 0.050 | 0.097 | 0.053 |
| 60 | 70% | 0.146 | 0.044 | 0.097 | 0.057 |
| 90 | 80% | 0.136 | 0.035 | 0.083 | 0.049 |
| 120 | 90% | 0.124 | 0.032 | 0.074 | 0.049 |
| 150 | 100% | 0.103 | 0.027 | 0.062 | 0.048 |
| 180 | 100% | 0.088 | 0.024 | 0.055 | 0.050 |

*at time of quench

TABLE 3

Pentad distribution of individual stereogradient-PP segments.

| Time(min) | Activation* | mmmm | mmmr | rmmr | mmrr | mmrm + rmrr |
|---|---|---|---|---|---|---|
| 30 | 60% | 0.085 | 0.142 | 0.059 | 0.105 | 0.265 |
| 30-60 | 60-70% | 0.073 | 0.136 | 0.066 | 0.093 | 0.249 |
| 60-90 | 70-80% | 0.146 | 0.196 | 0.064 | 0.106 | 0.273 |
| 90-120 | 80-90% | 0.297 | 0.221 | 0.026 | 0.075 | 0.254 |
| 120-150 | 90-100% | 0.612 | 0.121 | 0.010 | 0.089 | 0.057 |
| 150-180 | 100% | 0.730 | 0.097 | 0.001 | 0.098 | 0.018 |

| Time(min) | Activation* | mrrm | rrrr | rrrm | mrrm |
|---|---|---|---|---|---|
| 30 | 60% | 0.143 | 0.050 | 0.097 | 0.053 |
| 30-60 | 60-70% | 0.139 | 0.052 | 0.099 | 0.092 |
| 60-90 | 70-80% | 0.118 | 0.013 | 0.052 | 0.033 |
| 90-120 | 80-90% | 0.061 | 0.019 | 0.016 | 0.031 |
| 120-150 | 90-100% | 0.019 | 0.017 | 0.015 | 0.060 |
| 150-180 | 100% | 0.001 | 0.007 | 0.002 | 0.047 |

*during time of segment

Example 7

Structure Property Relationships for Stereoblock Polypropylene

Figure 14:
FIG. 14 is a graphical representation of three types of stereoblock poly(propylene) prepared according to an embodiment of the present invention.
Figure 14:
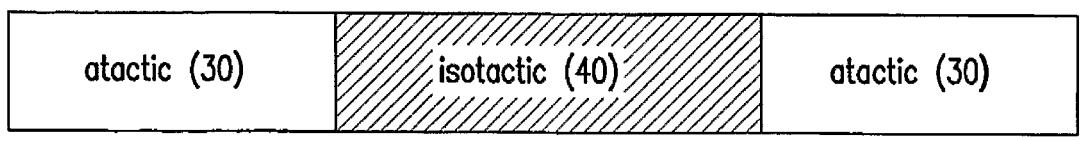
Figure 14:
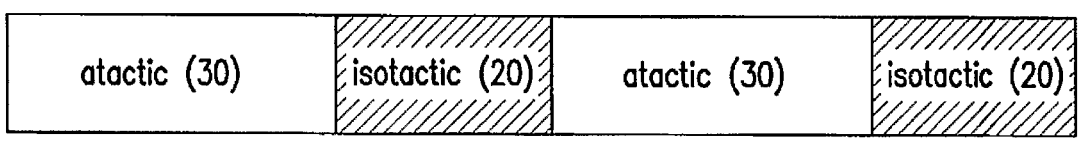

FIG. 14 graphically shows three different isotactic-atactic stereoblock poly(propylene) ("i-a sb-PP") architectures. The top schematic represents a 60-40 isotactic-atactic diblock, the middle schematic represents a 30-40-30 atactic-isotactic-atactic triblock, and the bottom schematic represents a 30-20-30-20 atactic-isotactic-atactic-isotactic tetrablock. These materials were synthesized, keeping the molecular weight and total isotactic content constant (Mn equals about 170,000, and mmm is about 0.32 (or 40% isotactic)).

Figure 15:
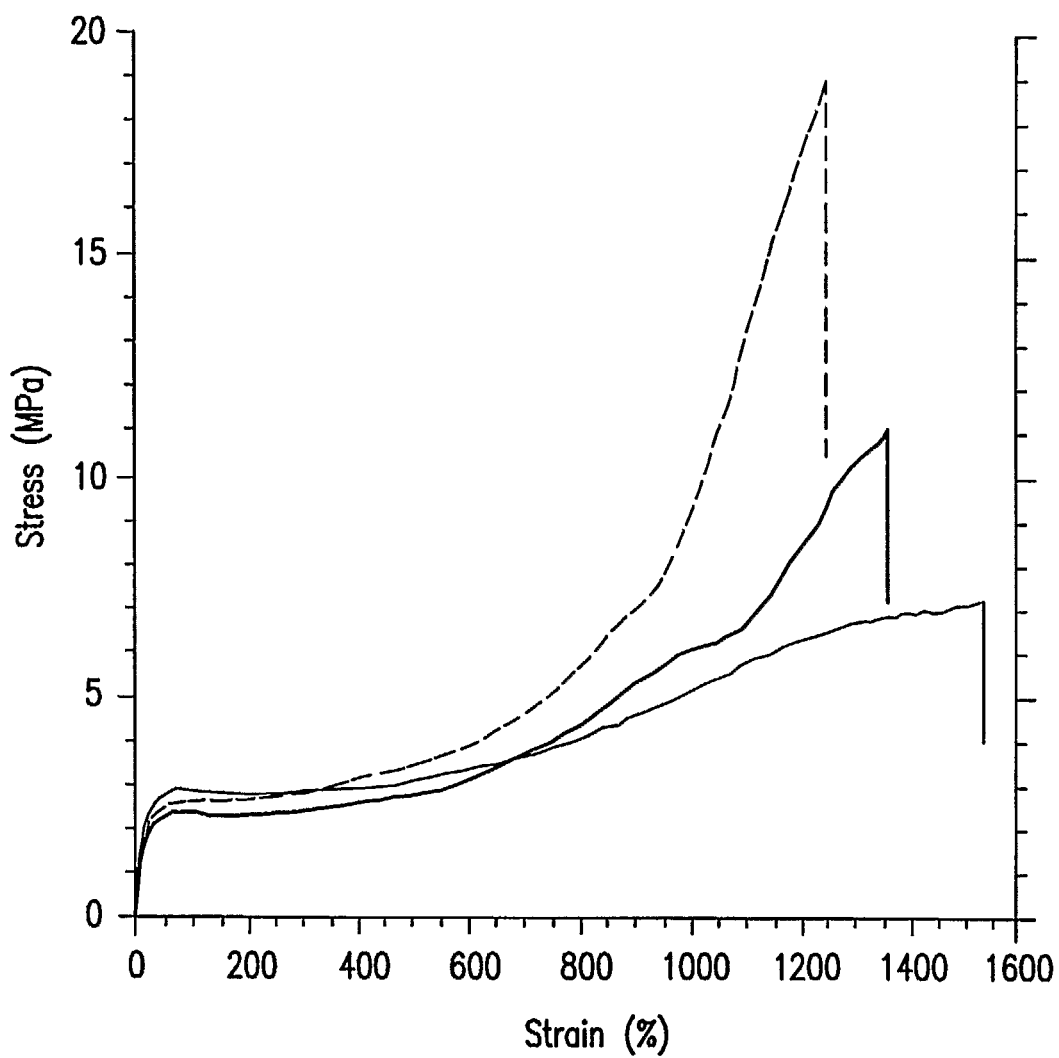
FIG. 15 shows stress-strain curves for three poly(propylene) samples prepared according to an embodiment of the present invention.

FIG. 15 shows that the tensile properties of standard dog-boneshaped samples of the three materials from FIG. 14 (using testing protocol ASTM D 412-98a; thickness: 0.5 mm). The stress-strain curves in FIG. 15 show the ultimate elongation to break for the triblock (bottom, solid line), diblock (middle, dotted line) and tetrablock (top, dashed line). The results demonstrated a clear dependency of the elastomeric properties on the stereoblock architecture. The triblock displayed the highest ultimate elongation to break of 1530% (70% recovery after break) relative to either the diblock at 1325% (84%) or the tetrablock at 1227% (91%).

Figure 16:
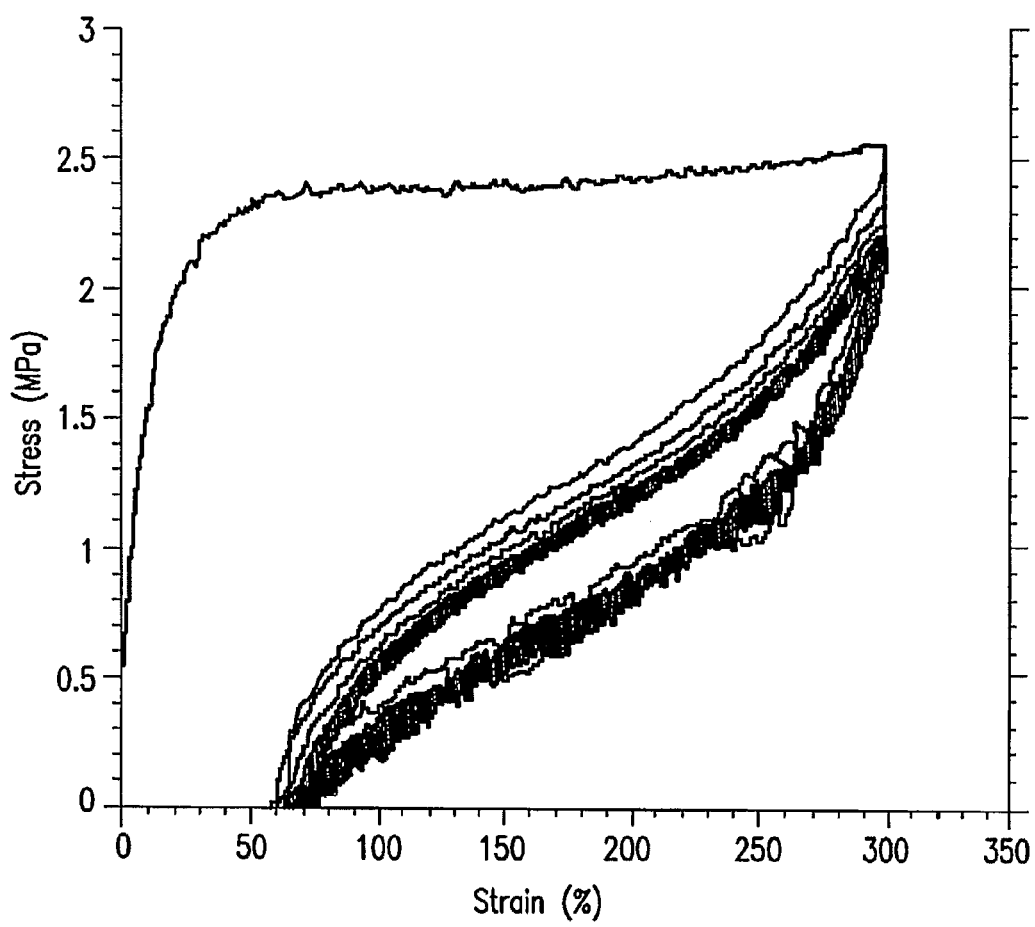
FIG. 16 shows a stress-strain hysteresis curve for a poly (propylene) sample prepared according to an embodiment of the present invention.

FIG. 16 shows stress-strain hysteresis curves for 10 cycles, in which a fresh, as prepared sample of the tetrablock a-i-a-i sb-PP material proved to be an exceptional elastomer after initial strain-induced annealing (2 cycles). Virtually no further irreversible deformation takes place within subsequent stress-strain cycles involving an initial maximum strain of 300%.

Example 8

Stereoblock Boundary Analysis in Stereoblock Poly(propylene)

To show that sharp block boundaries exist in the final i-a sb-PP materials, a 99% $^{13}$C-labeled methyl group was introduced at the beginning of the growth of a poly(propylene) chain using $^{13}$C-labeled 2. Aliquots were then taken after the synthesis of each new block and difference (next block-last block) $^{13}$C NMR spectra were produced.

Figure 17:
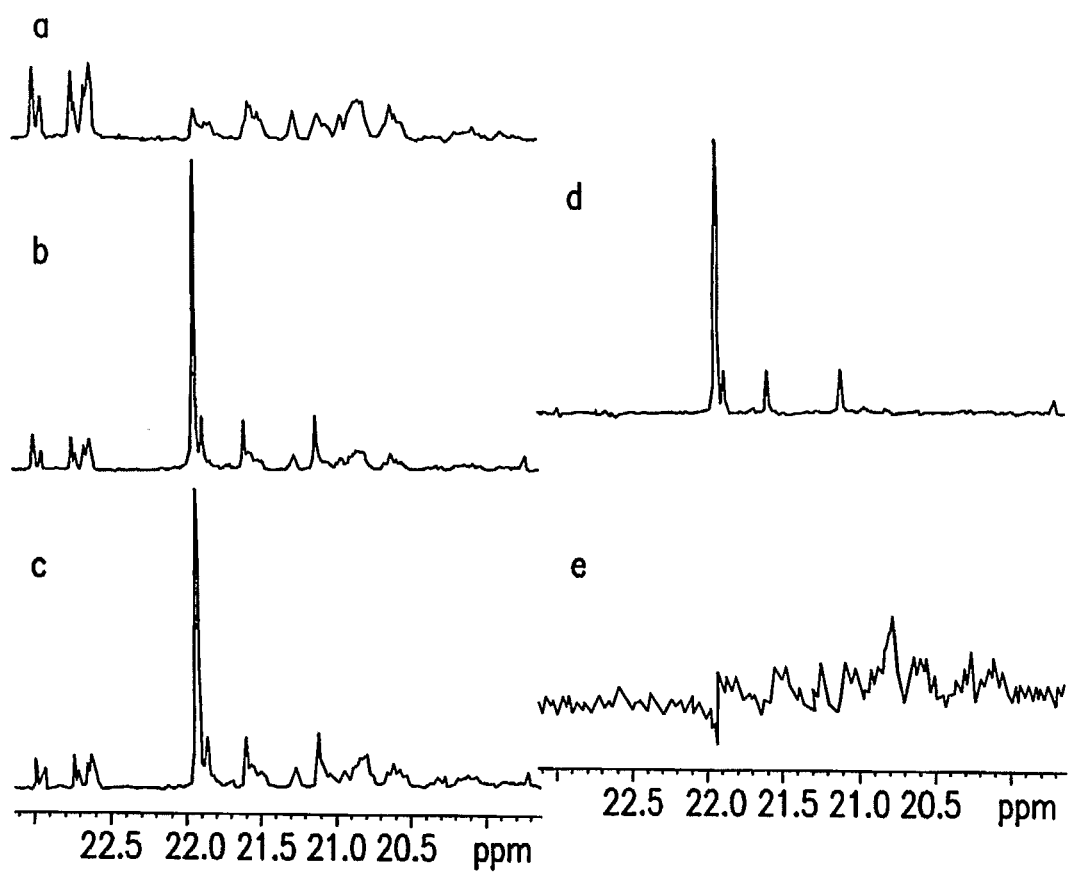
FIG. 17 shows NMR spectra for a stereoblock poly(propylene) prepared according to an embodiment of the present invention.

FIG. 17 shows $^{13}$C{H} NMR (125 MHz, 1,1,2,2-$C_2D_4Cl_2$, 70° C.) difference spectra, using the resonance of the $^{13}$C-labeled methyl end group as an internal reference. The spectra highlight the methyl regions of the aliquots taken. Spectrum (a) is the atactic block, spectrum (b) is an atactic-isotactic diblock and spectrum (c) is the final atactic-isotactic-atactic triblock. Spectrum (d) is the difference spectrum between (a) and (b), note the polymerization has switched from being purely atactic to highly isotactic. Spectrum (e) is the difference spectrum between (c) and (b), note that the polymerization has switched back from being highly isotactic to being purely atactic. The spectra confirmed that each new block added was either strictly isotactic or atactic as programmed.

The detailed NMR spectroscopic analysis also served to validate the routine use of the mmmm index from $^{13}$C NMR pentad analysis of aliquots to establish the compositional block structure of each new i-a sb-PP material that was synthesized (K. C. Jayaratne, L. R. Sita, *J. Am. Chem. Soc.* 122:958 (2000); K. C. Jayaratne, R. J. Keaton, D. A. Henningsen, L. R. Sita, *J. Am. Chem. Soc.* 122:10490 (2000); R. J. Keaton, K. C. Jayaratne, D. A. Henningsen, L. A. Koterwas, L. R. Sita, *J. Am. Chem. Soc.* 123:6197 (2001)). Importantly, in this regard, no attempt was made to rigorously compensate for changes in mass transfer of propylene and viscosity effects that can occur as a function of polymerization time, temperature and concentration. Quantitative block lengths within a target ia sb-PP multiblock structure were observed to vary slightly from run to run (e.g., a/i/a ratio of 1.0:1.2:0.8 observed for a target 1:1:1 a-i-a sb-PP triblock). Also note that while multiblock architectures commencing first with an isotactic block (i.e., an i-a-i sb-PP triblock) can be synthesized, the resulting isolated materials also have relative block lengths that deviate from those expected, owing to problems associated with occasional undesired precipitation of the pure isotactic block.

It will be understood by those skilled in the art that various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A composition comprising an elastomeric isotactic-atactic multiblock stereoblock poly(olefin) having substantially uniform microstructure, wherein the multiblock is a triblock, tetrablock, pentablock, hexablock, heptablock, octablock, nonablock, or decablock.

2. The composition of claim 1, wherein said poly(olefin) is a poly(olefin) of propene, 1-butene, 1-pentene, 1-hexene, 1-heptene, 1-octene, styrene, alpha-methyl styrene, 3-methylbutene, 3-methyl-1-pentene, vinylcyclohexane, vinylcyclobutane, vinylcyclopentane, vinylcyclooctane,1-decene, enantiomerically pure β-citronellene, 3,5,5-trimethyl-1-hexene, 4-methyl-1-pentene; a non-conjugated diene having the formula:

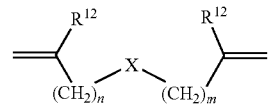

wherein X is $CH_2$, CO, $N(R^{13})$, O or S;
$R^{12}$ and $R^{13}$ are independently H, alkyl or phenyl; and
n and m are each independently an integer from 0-5; or mixtures thereof.

3. The composition of claim 1, wherein said poly(olefin) is poly(propylene).

4. The composition of claim 3, wherein the block length for each stereoblock of said isotactic-atactic poly(olefin) is the substantially same for all polymer chains.

5. The composition of claim 3, wherein said poly(propylene) is a monomodal elastomeric isotactic-atactic poly(propylene) having a substantially uniform microstructure.

6. The poly(propylene) of claim 5, wherein said poly(propylene) has polydispersity index of about 1.07 to about 1.25.

7. The poly(propylene) of claim 5, further comprising a number average molecular weight of about 18,300 to about 5,000,000.

8. The poly(propylene) of claim 5, having an ultimate elongation to break of about 1000 to about 1500%.

9. The poly(propylene) of claim 8, having a residual elongation of less than about 5% after a strain of about 150 to about 250%.

10. The poly(propylene) of claim 5, having a single melting point and a single crystallization point.

11. The poly(propylene) of claim 5, comprising isotactic poly(propylene) content in the range of about 10 to about 40%.

12. The poly(propylene) of claim 5, wherein said isotactic stereoblocks have (mmmm) pentad ratio of about 0.70 to about 0.75.

13. The poly(propylene) of claim 5, wherein said poly(propylene) exhibits microphase separation on the nanometer scale.

14. The poly(propylene) of claim 5, comprising monomodal isotactic-atactic-isotactic poly(propylene) having a substantially uniform microstructure.

15. The poly(propylene) of claim 14, wherein each poly(propylene) chain independently has the formula:

[chemical structure with CH₃ groups and subscripts h, i, g]

wherein g, h and i are independently an integer between 0 and 10,000; and
the polydispersity of said poly(propylene) chains is about 1.07 to about 1.25.

16. The composition of claim 1, wherein said isotactic-atactic poly(olefin) comprises about 10-40% isotactic poly(olefin).

17. The composition of claim 1, wherein said poly(olefin) has number average molecular weight greater than about 18,300.

18. The composition of claim 17, wherein said poly(olefin) has number average molecular weight of about 18,300 to about 5,000,000.

19. The composition of claim 1, wherein said poly(olefin) has monomodal molecular weight distribution.

20. The composition of claim 1, wherein said poly(olefin) has polydispersity index in the range of about 1.07 to about 1.25.

21. The composition of claim 1, wherein said isotactic stereoblock has (mmmm) pentad ratio in the range of about 0.70 to about 1.0.

22. The composition of claim 21, wherein said isotactic stereoblock has less than about 0.5% stereoerrors.

23. The composition of claim 22, wherein said isotactic stereoblock has about 0.1 to about 0.5% (2,1)-misinsertions.

24. The composition of claim 1, further comprising an isotactic-atactic triblock, tetrablock, pentablock, hexablock, heptablock, octablock, nonablock or decablock stereoblock poly(olefin) microstructure.

25. The composition of claim 1, further comprising an isotactic-atactic-isotactic triblock stereoblock poly(olefin).

26. The composition of claim 25, wherein said poly(olefin) is isotactic-atactic-isotactic triblock stereoblock poly(propylene).

27. The composition of claim 25, wherein each poly(olefin) chain independently has the formula:

[chemical structure with R¹⁰, R¹¹, R¹⁵ groups and subscripts h, i, g]

wherein g, h and i are independently zero or an integer between 1 and 10,000;
$R^{10}$, $R^{11}$ and $R^{15}$ are independently alkyl, cycloalkyl or optionally substituted phenyl; and
the polydispersity of said poly(olefin) composition is about 1.07 to about 1.25.

28. The composition of claim 1, wherein said isotactic and atactic stereoblocks comprise different poly(olefin)s.

29. The composition of claim 1, wherein said poly(olefin) exhibits microphase separation in the solid state.

30. The composition of claim 29, wherein said poly(olefin) exhibits microphase separation on the nanometer scale.

31. The composition of claim 1, wherein said elastomeric isotactic-atactic stereoblock poly(olefin) has substantially uniform and stereogradient microstructure.

32. A composition comprising isotactic-atactic stereogradient poly(olefin) having uniform microstructure, wherein said stereogradient poly(olefin) is a triblock, tetrablock, pentablock, hexablock, heptablock, octablock, nonablock, or decablock stereogradient poly,(olefin).

33. Tne composition of claim 32, wherein said poly(olefin) is poly(propylene).

34. The composition of claim 32, wherein said isotactic-atactic stereogradient microstructure comprises a mmmm pentad transition from greater than about 0.7 to less than about 0.5 over a fixed length of chiral centers.

35. The composition of claim 34, wherein said isotactic-atactic stereogradient microstructure comprises a mmmm pentad transition from greater than about 0.7 to less than about 0.3 over a fixed length of chiral centers.

* * * * *